United States Patent
Patil et al.

(10) Patent No.: US 12,159,178 B2
(45) Date of Patent: Dec. 3, 2024

(54) APPARATUS AND METHOD FOR DEPLOYING A MOBILE DEVICE AS A DATA SOURCE

(71) Applicant: Nutanix, Inc., San Jose, CA (US)

(72) Inventors: Mahesh Patil, San Jose, CA (US); Naorem Khogendro Singh, San Jose, CA (US); Pankit Thapar, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/932,235

(22) Filed: Sep. 14, 2022

(65) Prior Publication Data

US 2023/0070811 A1    Mar. 9, 2023

Related U.S. Application Data

(62) Division of application No. 16/920,235, filed on Jul. 2, 2020, now Pat. No. 11,501,881.

(Continued)

(51) Int. Cl.
*H04L 67/125* (2022.01)
*G06K 7/14* (2006.01)
(Continued)

(52) U.S. Cl.
CPC ........ *G06K 19/06037* (2013.01); *G16Y 40/10* (2020.01); *G16Y 40/35* (2020.01);
(Continued)

(58) Field of Classification Search
CPC ........ G16Y 40/10; G16Y 40/35; H04L 67/02; H04L 67/125; H04L 67/10; H04L 67/12
See application file for complete search history.

(56) References Cited

U.S. PATENT DOCUMENTS

| | | |
|---|---|---|
| 6,550,057 B1 | 4/2003 | Bowman-Amuah |
| 7,237,360 B2 | 7/2007 | Moncho et al. |

(Continued)

FOREIGN PATENT DOCUMENTS

| | | |
|---|---|---|
| CN | 101916200 A | 8/2015 |
| CN | 110795442 B | 4/2022 |

(Continued)

OTHER PUBLICATIONS

U.S. Appl. No. 18/047,623 titled "Common Services Model for Multi-Cloud Platform" filed Oct. 18, 2022.

(Continued)

*Primary Examiner* — Jason D Recek
(74) *Attorney, Agent, or Firm* — Stoel Rives LLP

(57) ABSTRACT

An example Internet of Things (IoT) sensor application hosted on a mobile device is configured to add the mobile device as a data sensor or source in the IT system. The IoT sensor application is configured to provide an interface between an input or output component of the mobile device and a data pipeline or application and/or to cloud data storage associated with an IoT system. The IoT sensor application is configured to connect to an edge device of the IoT system and search for a data source identifier associated with the type of data source component, and corresponding application(s) and/or data pipeline(s) to which the data source is connected. Once connected, the IoT sensor application provides captured data to or receives processed or playback data from the data source.

26 Claims, 6 Drawing Sheets

Related U.S. Application Data

(60) Provisional application No. 62/870,313, filed on Jul. 3, 2019.

(51) Int. Cl.
    *G06K 19/06*      (2006.01)
    *G16Y 40/10*      (2020.01)
    *G16Y 40/35*      (2020.01)
    *H04L 67/02*      (2022.01)

(52) U.S. Cl.
    CPC ............ *H04L 67/02* (2013.01); *H04L 67/125* (2013.01); *G06K 7/1439* (2013.01)

(56) References Cited

U.S. PATENT DOCUMENTS

| | | |
|---|---|---|
| 7,310,664 B1 | 12/2007 | Merchant et al. |
| 8,543,665 B2 | 9/2013 | Ansari et al. |
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,210,534 B1 | 12/2015 | Matthieu et al. |
| 9,244,951 B2 | 1/2016 | Mandelstein et al. |
| 9,253,252 B2 | 2/2016 | Agarwal et al. |
| 9,336,132 B1 | 5/2016 | Aron et al. |
| 9,600,494 B2 | 3/2017 | Maluf et al. |
| 9,606,794 B1 | 3/2017 | Chou et al. |
| 9,633,197 B2 | 4/2017 | Lakshmanan et al. |
| 9,634,893 B2 | 4/2017 | Boutros et al. |
| 9,641,650 B2 | 5/2017 | Virkki et al. |
| 9,652,265 B1 | 5/2017 | Narayanasamy et al. |
| 9,684,502 B2 | 6/2017 | Fu et al. |
| 9,729,411 B2 | 8/2017 | Purusothaman |
| 9,736,194 B1 | 8/2017 | Rao et al. |
| 9,747,287 B1 | 8/2017 | Bhardwaj et al. |
| 9,769,032 B1 | 9/2017 | Ghodsi et al. |
| 9,772,866 B1 | 9/2017 | Aron et al. |
| 9,836,296 B2 | 12/2017 | Vandikas et al. |
| 9,860,677 B1 | 1/2018 | Agerstam et al. |
| 9,917,865 B2 | 3/2018 | Arora et al. |
| 9,977,415 B2 | 5/2018 | Zimmerman et al. |
| 10,091,270 B2 | 10/2018 | Fang |
| 10,149,154 B2 | 12/2018 | Zimmerman et al. |
| 10,156,842 B2 | 12/2018 | Wu et al. |
| 10,181,978 B1 | 1/2019 | Argenti |
| 10,225,335 B2 | 3/2019 | Fu et al. |
| 10,230,798 B2 | 3/2019 | Doraiswamy et al. |
| 10,262,019 B1 | 4/2019 | Reiner et al. |
| 10,291,714 B2 | 5/2019 | Mathews et al. |
| 10,306,513 B2 | 5/2019 | Bartfai-Walcott et al. |
| 10,489,138 B1 | 11/2019 | Wu et al. |
| 10,515,119 B2 | 12/2019 | Kirk et al. |
| 10,534,629 B1 | 1/2020 | St. Pierre et al. |
| 10,567,925 B2 | 2/2020 | Ly et al. |
| 10,652,226 B2 | 5/2020 | Islam et al. |
| 10,685,295 B1 | 6/2020 | Ross et al. |
| 10,769,113 B2 | 9/2020 | Jones |
| 10,838,833 B1 | 11/2020 | Jibaja et al. |
| 10,893,116 B1 | 1/2021 | Koehler |
| 10,924,342 B2 | 2/2021 | Joshi et al. |
| 11,178,213 B2 | 11/2021 | Desai et al. |
| 11,194,483 B1 | 12/2021 | Dontu et al. |
| 11,301,762 B1 | 4/2022 | Chen et al. |
| 11,316,733 B1 | 4/2022 | Johson et al. |
| 11,379,525 B1 | 7/2022 | Deutsch et al. |
| 11,397,692 B2 | 7/2022 | Chhabra et al. |
| 11,409,756 B1 | 8/2022 | Park et al. |
| 11,422,863 B2 | 8/2022 | Sengupta et al. |
| 11,429,893 B1 | 8/2022 | Tong |
| 11,501,881 B2 | 11/2022 | Patil et al. |
| 11,635,990 B2 | 4/2023 | Singh et al. |
| 11,665,221 B2 | 5/2023 | Joshi et al. |
| 11,726,764 B2 | 8/2023 | Joshi et al. |
| 2002/0143819 A1* | 10/2002 | Han .................... G06F 16/958 715/237 |
| 2004/0177359 A1 | 9/2004 | Bauch et al. |
| 2005/0060328 A1 | 3/2005 | Suhonen et al. |
| 2008/0270515 A1 | 10/2008 | Chen et al. |
| 2009/0204711 A1 | 8/2009 | Binyamin |
| 2009/0260004 A1 | 10/2009 | Datta et al. |
| 2010/0008510 A1 | 1/2010 | Zayas |
| 2010/0077473 A1* | 3/2010 | Ohta .................. G06F 21/52 726/16 |
| 2010/0175061 A1 | 7/2010 | Maeda et al. |
| 2011/0153824 A1 | 6/2011 | Chikando et al. |
| 2011/0231899 A1 | 9/2011 | Pulier et al. |
| 2011/0251992 A1 | 10/2011 | Bethlehem et al. |
| 2011/0265077 A1 | 10/2011 | Collison et al. |
| 2012/0102486 A1 | 4/2012 | Yendluri |
| 2012/0167081 A1 | 6/2012 | Sedayao et al. |
| 2012/0265884 A1 | 10/2012 | Zhang et al. |
| 2012/0266156 A1 | 10/2012 | Spivak et al. |
| 2012/0281708 A1 | 11/2012 | Chauhan et al. |
| 2013/0219479 A1* | 8/2013 | DeSoto .................. H04L 63/10 726/6 |
| 2013/0227573 A1 | 8/2013 | Morsi et al. |
| 2013/0304903 A1 | 11/2013 | Mick et al. |
| 2013/0332916 A1 | 12/2013 | Chinn et al. |
| 2014/0074539 A1 | 3/2014 | Doering et al. |
| 2014/0075412 A1 | 3/2014 | Kannan et al. |
| 2014/0075431 A1 | 3/2014 | Kumar et al. |
| 2014/0164486 A1 | 6/2014 | Ravinchandran et al. |
| 2014/0279899 A1 | 9/2014 | Gu et al. |
| 2014/0317261 A1 | 10/2014 | Shatzkamer et al. |
| 2014/0330948 A1 | 11/2014 | Dunn et al. |
| 2014/0372508 A1 | 12/2014 | Fausak et al. |
| 2015/0057817 A1 | 2/2015 | Endrizzi et al. |
| 2015/0067030 A1 | 3/2015 | Smith et al. |
| 2015/0074106 A1 | 3/2015 | Ji |
| 2015/0120893 A1 | 4/2015 | Sapaliga et al. |
| 2015/0261876 A1 | 9/2015 | Trikha et al. |
| 2015/0347542 A1 | 12/2015 | Sullivan et al. |
| 2016/0007138 A1 | 1/2016 | Palanisamy et al. |
| 2016/0092176 A1 | 3/2016 | Straub et al. |
| 2016/0092180 A1 | 3/2016 | Straub |
| 2016/0092348 A1 | 3/2016 | Straub et al. |
| 2016/0094398 A1 | 3/2016 | Choudhary et al. |
| 2016/0098265 A1 | 4/2016 | Mahajan et al. |
| 2016/0112268 A1 | 4/2016 | Chung et al. |
| 2016/0156614 A1 | 6/2016 | Jain et al. |
| 2016/0197830 A1 | 7/2016 | Ulevitch et al. |
| 2016/0202964 A1 | 7/2016 | Butcher et al. |
| 2016/0216959 A1 | 7/2016 | Kurian et al. |
| 2016/0234071 A1 | 8/2016 | Nambiar et al. |
| 2016/0315848 A1 | 10/2016 | Weinstein |
| 2016/0315912 A1 | 10/2016 | Mayya et al. |
| 2016/0323161 A1 | 11/2016 | Cuervo Laffaye et al. |
| 2016/0323361 A1 | 11/2016 | Austel et al. |
| 2016/0337104 A1 | 11/2016 | Kalligudd |
| 2016/0337175 A1 | 11/2016 | Rao |
| 2016/0342906 A1 | 11/2016 | Shaashua et al. |
| 2016/0344745 A1 | 11/2016 | Johnson et al. |
| 2016/0345516 A1 | 12/2016 | Britt et al. |
| 2016/0357525 A1 | 12/2016 | Wee et al. |
| 2017/0005820 A1 | 1/2017 | Zimmerman et al. |
| 2017/0006135 A1 | 1/2017 | Siebel et al. |
| 2017/0048079 A1 | 2/2017 | Nethi et al. |
| 2017/0060574 A1 | 3/2017 | Malladi et al. |
| 2017/0097950 A1 | 4/2017 | Meacham et al. |
| 2017/0099176 A1 | 4/2017 | Jain |
| 2017/0102931 A1 | 4/2017 | Risbood et al. |
| 2017/0123939 A1 | 5/2017 | Maheshwari et al. |
| 2017/0126809 A1 | 5/2017 | Chen et al. |
| 2017/0142068 A1 | 5/2017 | Devarajan et al. |
| 2017/0149931 A1 | 5/2017 | Lochhead et al. |
| 2017/0168813 A1 | 6/2017 | Pogrebinsky et al. |
| 2017/0171607 A1 | 6/2017 | Britt |
| 2017/0177334 A1 | 6/2017 | Chou et al. |
| 2017/0177877 A1 | 6/2017 | Suarez et al. |
| 2017/0180272 A1 | 6/2017 | Bernath |
| 2017/0180346 A1 | 6/2017 | Suarez et al. |

(56) References Cited

U.S. PATENT DOCUMENTS

| | | |
|---|---|---|
| 2017/0185507 A1 | 6/2017 | Eberlein |
| 2017/0185922 A1 | 6/2017 | Lange et al. |
| 2017/0187807 A1 | 6/2017 | Clernon |
| 2017/0201411 A1 | 7/2017 | Mladin et al. |
| 2017/0201585 A1 | 7/2017 | Doraiswamy et al. |
| 2017/0212718 A1* | 7/2017 | Nelson ................ G06F 3/04817 |
| 2017/0213157 A1 | 7/2017 | Bugay et al. |
| 2017/0244600 A1 | 8/2017 | Hussein et al. |
| 2017/0257432 A1 | 9/2017 | Fu et al. |
| 2017/0289173 A1 | 10/2017 | Resch et al. |
| 2017/0315820 A1 | 11/2017 | Entezari et al. |
| 2017/0347264 A1 | 11/2017 | Holland et al. |
| 2018/0007055 A1 | 1/2018 | Infante-Lopez et al. |
| 2018/0013819 A1 | 1/2018 | Li |
| 2018/0034914 A1 | 2/2018 | Christopher et al. |
| 2018/0054315 A1 | 2/2018 | Liu et al. |
| 2018/0054490 A1 | 2/2018 | Wadhwa et al. |
| 2018/0067830 A1 | 3/2018 | Jagtiani et al. |
| 2018/0092151 A1 | 3/2018 | Liu et al. |
| 2018/0101415 A1 | 4/2018 | Mahindru et al. |
| 2018/0109395 A1 | 4/2018 | Berdy et al. |
| 2018/0109650 A1 | 4/2018 | Berdy et al. |
| 2018/0109929 A1 | 4/2018 | Ly et al. |
| 2018/0123820 A1 | 5/2018 | Kim |
| 2018/0159745 A1 | 6/2018 | Byers et al. |
| 2018/0167392 A1 | 6/2018 | Zakaria |
| 2018/0212970 A1* | 7/2018 | Chen .................... H04L 9/3236 |
| 2018/0219877 A1 | 8/2018 | Hsu et al. |
| 2018/0234351 A1 | 8/2018 | Amento et al. |
| 2018/0293463 A1 | 10/2018 | Brown |
| 2018/0295194 A1* | 10/2018 | Deraz .................... H04L 67/51 |
| 2018/0300124 A1 | 10/2018 | Malladi et al. |
| 2018/0302266 A1 | 10/2018 | Makovsky et al. |
| 2018/0307464 A1 | 10/2018 | Bijani et al. |
| 2018/0307537 A1 | 10/2018 | Chen et al. |
| 2018/0309819 A1 | 10/2018 | Thompson |
| 2018/0314808 A1 | 11/2018 | Casey et al. |
| 2018/0324204 A1 | 11/2018 | Mcclory et al. |
| 2018/0332116 A1 | 11/2018 | George et al. |
| 2018/0338242 A1 | 11/2018 | Li et al. |
| 2018/0373419 A1 | 12/2018 | Chen et al. |
| 2018/0373555 A1 | 12/2018 | Gupta et al. |
| 2019/0014048 A1 | 1/2019 | Krishna Singuru |
| 2019/0018951 A1 | 1/2019 | James et al. |
| 2019/0026082 A1 | 1/2019 | Shalev et al. |
| 2019/0034837 A1 | 1/2019 | Lou et al. |
| 2019/0041824 A1 | 2/2019 | Chavez et al. |
| 2019/0045033 A1 | 2/2019 | Agerstam et al. |
| 2019/0068445 A1 | 2/2019 | Chauhan et al. |
| 2019/0087220 A1 | 3/2019 | Turner |
| 2019/0098113 A1 | 3/2019 | Park et al. |
| 2019/0109816 A1 | 4/2019 | Liu et al. |
| 2019/0114211 A1 | 4/2019 | Reddipalli et al. |
| 2019/0121889 A1 | 4/2019 | Gold et al. |
| 2019/0123959 A1 | 4/2019 | Joshi et al. |
| 2019/0141022 A1 | 5/2019 | Reeve et al. |
| 2019/0146773 A1 | 5/2019 | Attard |
| 2019/0158353 A1 | 5/2019 | Johnson et al. |
| 2019/0158600 A1 | 5/2019 | Cook |
| 2019/0182333 A1 | 6/2019 | Bartfai-Walcott et al. |
| 2019/0188742 A1 | 6/2019 | Vasudevan et al. |
| 2019/0190776 A1 | 6/2019 | Bregman et al. |
| 2019/0213273 A1 | 7/2019 | Vasudevan et al. |
| 2019/0243836 A1 | 8/2019 | Nanda et al. |
| 2019/0251166 A1 | 8/2019 | Penrose et al. |
| 2019/0286353 A1 | 9/2019 | Soni et al. |
| 2019/0295012 A1 | 9/2019 | Marinescu et al. |
| 2019/0319919 A1 | 10/2019 | Knecht et al. |
| 2019/0320038 A1 | 10/2019 | Walsh et al. |
| 2019/0342182 A1 | 11/2019 | Dhanabalan et al. |
| 2019/0384641 A1 | 12/2019 | Zhao et al. |
| 2020/0014607 A1 | 1/2020 | Gangaadhar et al. |
| 2020/0014633 A1 | 1/2020 | You et al. |
| 2020/0034776 A1 | 1/2020 | Peran et al. |
| 2020/0073739 A1 | 3/2020 | Rungta et al. |
| 2020/0092789 A1 | 3/2020 | Lee et al. |
| 2020/0097274 A1 | 3/2020 | Sarkar et al. |
| 2020/0104723 A1 | 4/2020 | Reissner et al. |
| 2020/0112487 A1 | 4/2020 | Inamdar et al. |
| 2020/0122038 A1 | 4/2020 | Ebrahimi et al. |
| 2020/0126129 A1 | 4/2020 | Lkhamsuren |
| 2020/0127832 A1* | 4/2020 | Ebrahimi ............... H04W 12/77 |
| 2020/0177503 A1 | 6/2020 | Hooda et al. |
| 2020/0177630 A1 | 6/2020 | Penner et al. |
| 2020/0192690 A1 | 6/2020 | Gupta et al. |
| 2020/0218580 A1 | 7/2020 | Kim |
| 2020/0250002 A1 | 8/2020 | Gururaj et al. |
| 2020/0258627 A1 | 8/2020 | Setegn et al. |
| 2020/0274776 A1 | 8/2020 | Nishikawa |
| 2020/0287737 A1 | 9/2020 | Mishra et al. |
| 2020/0336467 A1 | 10/2020 | Subbarayan et al. |
| 2020/0356415 A1 | 11/2020 | Goli |
| 2021/0004270 A1 | 1/2021 | Singh et al. |
| 2021/0005330 A1 | 1/2021 | Patil et al. |
| 2021/0006636 A1 | 1/2021 | Koehler et al. |
| 2021/0042104 A1 | 2/2021 | Tashkandi |
| 2021/0042160 A1 | 2/2021 | Alamouti et al. |
| 2021/0044579 A1 | 2/2021 | Nelson-Gal et al. |
| 2021/0058338 A1 | 2/2021 | Liu |
| 2021/0067607 A1 | 3/2021 | Gardner et al. |
| 2021/0084670 A1 | 3/2021 | Chauhan et al. |
| 2021/0089408 A1 | 3/2021 | Park et al. |
| 2021/0112059 A1 | 4/2021 | Heldman et al. |
| 2021/0112128 A1 | 4/2021 | Joshi et al. |
| 2021/0140815 A1 | 5/2021 | Pretorius et al. |
| 2021/0160338 A1 | 5/2021 | Koehler et al. |
| 2021/0232344 A1 | 7/2021 | Corrie |
| 2021/0255846 A1 | 8/2021 | Mamgain et al. |
| 2021/0271565 A1 | 9/2021 | Bhavanarushi et al. |
| 2021/0311764 A1 | 10/2021 | Rosoff et al. |
| 2021/0342193 A1 | 11/2021 | Anand |
| 2021/0373965 A1 | 12/2021 | Hadas et al. |
| 2021/0400043 A1 | 12/2021 | Su et al. |
| 2022/0083018 A1 | 3/2022 | Majeed et al. |
| 2022/0083389 A1 | 3/2022 | Poothia et al. |
| 2022/0121543 A1 | 4/2022 | Poothia et al. |
| 2022/0138070 A1 | 5/2022 | Mokashi et al. |
| 2022/0147336 A1 | 5/2022 | Joshi et al. |
| 2022/0159093 A1 | 5/2022 | Joshi et al. |
| 2022/0279046 A1 | 9/2022 | Perng et al. |
| 2022/0334882 A1 | 10/2022 | Wang |
| 2023/0141808 A1 | 5/2023 | Joshi et al. |
| 2023/0289225 A1 | 9/2023 | Singh et al. |

FOREIGN PATENT DOCUMENTS

| | | |
|---|---|---|
| EP | 2831746 A1 | 2/2015 |
| WO | 9945465 A1 | 9/1999 |
| WO | 2014007811 A1 | 1/2014 |
| WO | 2020096639 A1 | 5/2020 |

OTHER PUBLICATIONS

"Anthos", Google Cloud https://cloud.google.com/anthos, Apr. 21, 2020, pp. 1-26.

"Architecting For The Cloud: AWS Best Practice", Amazon Web Services https://d1.awsstatic.com/whitepapers/AWS_Cloud_Best_Practices.pdf, Oct. 2018, pp. 1-50.

"Architecting VMware Unified Access Gateway", https://www.youtube.com/watch?v=URSdJ9qCQKo&t=234s, Apr. 17, 2019, pp. 1.

"Available Supporting Components", https://docs.openshift.com/container-platform/4.1/architecture/understanding-development.html#supporting-components retrieved May 27, 2022 relevant to OpenShift Container Platform 4.1 general availability Jun. 4, 2019, general availability Jun. 4, 2019, pp. 1-2.

"AWS Architecture Monthly—Internet of Things Jun. 2019", AWS | https://d1.awsstatic.com/whitepapers/architecture-monthly/AWS-Architecture-Monthly-June-2019.pdf, Jun. 2019.

"AWS IoT Greengrass", https://web.archive.org/web/20190624094650/https://aws.amazon.com/greengrass/, Jun. 2019, pp. 1-13.

(56) References Cited

OTHER PUBLICATIONS

"AWS IoT vs. Google IoT vs. Azure IoT", Bizety | https://www.bizety.com/2018/08/28/aws-iot-vs-google-iot-vs-azure-iot/, Aug. 28, 2018, pp. 1-7.
"Azure IoT Central intro walkthrough", https://www.youtube.com/watch?v=G32stXSwtyA&ab_channel=MicrosoftDeveloper, Feb. 2018.
"Best Practices for Cloud Management", Service Now https://www.servicenow.com/content/dam/servicenow-assets/public/en-US/doc-type/resource-center/solution-brief/sb-cloud-management.pdf, Jun. 2017, pp. 1-2.
"Cloud IoT Core", https://web.archive.org/web/20190129000453/https:/cloud.google.com/iot-core/, https://web.archive.org/web/20190129000453/https:/cloud.google.com/iot-core/, Jan. 2019, pp. 1-10.
"Cloud IoT Core—Devices, configuration, and state", Google | https://web.archive.org/web/20190330153113/https://cloud.google.com/iot/docs/concepts/devices, Mar. 2019.
"Cloud IoT Core Private Beta", Google | https://web.archive.org/web/20170518022234/https://cloud.google.com/iot-core/, May 2017.
"Comprehensive Guide on Upgrading PKS", PKS 1.3 https://kb.vmware.com/sfc/servlet.shepherd/version/download/068f4000009EfWPAAO, Apr. 2019, pp. 1-45.
"Deploying and Configuring VMware Unified Access Gateway", VMware | Unified Access Gateway 3.1 https://techzone.vmware.com/configuring-edge-services-vmware-unified-access-gateway-vmware-workspace-one-operational-tutorial#overview, Oct. 27, 2017, pp. 1-89.
"Extended offline operation with Azure IoTEdge", Microsoft | https://azure.microsoft.com/en-US/blog/extended-offline-operation-with-azure-iot-edge/, Sep. 2018.
"Extract, Transform, Load with AWS IoT Greengrass Solution Accelerator", AWS | https://aws.amazon.com/iot/solutions/etl-accelerator/, Oct. 2019, pp. 1-6.
"Google Cloud IoT Core", Google | https://www.slideshare.net/idof/google-cloud-iot-core, Sep. 2018.
"How to adopt a multi-cluster strategy for your applications in Anthos", YouTube | Google Cloud Tech https://www.youtube.com/watch?v=ZhF-rTXq-US&list=PLlivdWyY5sqKN73vzKpg2p2JmOGoANOCG&index=6, May 29, 2020, pp. 1.
"How to get started with Anthos on Google Cloud", YouTube | Google Cloud Tech https://www.youtube.com/watch?v=ghFiaz7juoA&list=PLlivdWyY5sqKN73vzKpg2p2JmOGoANOCG&index=4, Apr. 30, 2020, pp. 1.
"How to Troubleshoot PKS Upgrade Issues", VMware Tanzu Support Hub https://community.pivotal.io/s/article/how-to-troubleshoot-pks-upgrade-issues?language=en_US, Jul. 17, 2019, pp. 1-11.
"IBM Edge Application Manager", IBM https://www.IBM.com/cloud/edge-application-manager, May 5, 2020.
"Introducing Google Cloud IoT Core: forsecurely connecting and managing IoTdevices at scale", Google Cloud | https://cloud.google.com/blog/products/gcp/introducing-google-cloud-iot-core-for-securely-connecting-and-managing-iot-devices-at-scale, May 2017.
"IoT at the Edge: Bringing intelligence to the edge using Cloud IoT (Cloud Next '18)", YouTube; Google Cloud Tech https://www.youtube.com/watch?v=-T9MNR-BI8I, Aug. 17, 2018, pp. 1.
"IoT Core device-to-device communication", Google |https://cloud.google.com/community/tutorials/iot-device-to-device, Dec. 2017.
"IoT Partner Quickstart", https://services.google.com/fh/files/misc/iot_partner_quickstart1.0.pdf, Nov. 15, 2018, pp. 1-13.
"Journey to OpenShift in a Multi-Cloud Environment, Part 3", RedHat Hybrid Cloud | Blog https://cloud.redhat.com/blog/journey-openshift-multi-cloud-environment-part-3, Jan. 2, 2018, pp. 1-4.
"Meeting at the Edge with VMware Internet of Things (IoT)", https://blogs.vmware.com/edge/files/2017/04/Meeting-at-the-Edge.pdf, Apr. 2017, pp. 1-9.
"Microsoft Azure IoT Reference Architecture", Version 2.0 Release, May 2, 2018, pp. 1-79.
"Microsoft IoT Central delivers low-code wayto build IoT solutions fast", Microsoft | https://azure.microsoft.com/en-US/blog/microsoft-iot-central-delivers-low-code-way-to-build-iot-solutions-fast/, Dec. 2017.
"Migrating Kubernetes apps to Serverless with Cloud Run on Anthos", YouTube | Google Cloud Tech https://www.youtube.com/watch?v=0T5UliS9j8A, Nov. 19, 2019, pp.
"Mobile Content Management", VMWare | https://www.vmware.com/content/dam/digitalmarketing/vmware/en/pdf/workspace-one/vmware-airwatch-mcm-datasheet.pdf, Dec. 2019, pp. 1-4.
"mPRM: An Overview", ProSyst http://documentation.bosch-si.com/iot/PRM/v6.0/welcome/mprm_functional.html, Jun. 13, 2017, pp. 1-3.
"Multi-Process Service", Nvidia, vR450, https://docs.nvidia.com/deploy/pdf/CUDA_Multi_Process_Service_Overview.pdf, Jun. 2020, pp. 1-28.
"New Technology Projection: The Total Economic Impact of Anthos", A Forrester Total Economic Impact https://services.google.com/fh/files/misc/the_total_economic_impact_of_anthos.pdf?mkt_tok=ODA4LUdKVy0zMTQAAAGEowKcUaDaTyTRyP0rnurezYOwrjB4GihzmPwbs7d0qMaMhJZtax3Of12Gx2-HRDm4SifQME2gL7297yUgZ3FEMxg5UdUp3eFaN5j_Oie7D0ta28s, Nov. 2019, pp. 1-26.
"OpenShift Container Platform Architecture", https://docs.openshift.com/container-platform/4.1/architecture/architecture.html retrieved May 27, 2022 relevant to OpenShift Container Platform 4.1, general availability Jun. 4, 2019, pp. 1-11.
"OpenShift Container Platform cluster monitoring, logging, and Telemetry", RedHat https://access.redhat.com/documentation/en-US/openshift_container_platform/4.2/html/container-native_virtualization/container-native-virtualization-user-s-guide#cnv-openshift-cluster-monitoring, Oct. 16, 2019, pp. 1-7.
"OpenShift Container Platform installation overview", https://docs.openshift.com/container-platform/4.1/architecture/architecture-installation.html retrieved May 27th relevant to OpenShift Container Platform 4.1 general availability Jun. 4, 2019, pp. 1-13.
"Overview: OpenShift Container Platform", https://docs.openshift.com/container-platform/3.9/getting_started/index.html retrieved May 24th relevant to OpenShift Container Platform 3.9 general availability Oct. 2018, pp. 1-2.
"Overview: OpenShift v3", https://docs.openshift.com/container-platform/3.9/architecture/index.html retrieved May 24, 2022 relevant to OpenShift Container Platform 3.9 general availability Oct. 2018, pp. 1-9.
"Overview: Templates", https://docs.openshift.com/container-platform/3.9/dev_guide/templates.html retrieved May 24, 2022 relevant to OpenShift Container Platform 3.9 general availability Oct. 2018, pp. 1-27.
"Pivotal CF 1.3 App Dashboard and Usage Reports", YouTube https://www.youtube.com/watch?v=jpGUbjh8IUY, Sep. 25, 2014, pp. 1.
"Pivotal Cloud Foundry Documentation", Pivotal Version 2.0 https://resources.docs.pivotal.io/pdfs/pcf-docs-2.0.pdf, Dec. 20, 2018, pp. 1-1591.
"Pivotal Container Service (PKS)", Pivotal Version 1.2 https://resources.docs.pivotal.io/pdfs/pks-1-2.pdf, Sep. 3, 2019, pp. 1-323.
"Pivotal Container Service Overview", Slideshare https://www.slideshare.net/Pivotal/pivotal-container-service-overview, Jul. 16, 2019, pp. 1-78.
"Red Hat Enterprise Linux CoreOS (RHCOS)", https://docs.openshift.com/container-platform/4.1/architecture/architecture-rhcos.html retrieved May 27, 2022 relevant to OpenShift Container Platform 4.1 general availability Jun. 4, 2019, pp. 1-16.
"Release Notes for VMware Unified Access Gateway 3.1 and 3.1.1", https://docs.vmware.com/en/Unified-Access-Gateway/3.1/rn/unified_access_gateway-31-release-notes.html, Oct. 27, 2017, pp. 1-4.
"Service Catalog", https://docs.openshift.com/container-platform/3.9/architecture/service_catalog/index.html retrieved May 24, 2022 relevant to OpenShift Container Platform 3.9 general availability Oct. 2018, pp. 1-9.

(56) References Cited

OTHER PUBLICATIONS

"Setting up ServiceNow Cloud Management", DxSherpa https://dxsherpa.com/blogs/setting-up-servicenow-cloud-management/, Jul. 19, 2018, pp. 1-10.
"Template Service Broker", https://docs.openshift.com/container-platform/3.9/architecture/service_catalog/template_service_broker.html retrieved May 24, 2022 relevant to OpenShift Container Platform 3.9 general availability Oct. 2018, pp. 1-2.
"TensorFlow Serving", GitHub, https://github.com/tensorflow/serving, 2021, pp. 1-4.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Feb. 5, 2019, pp. 1-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Mar. 6, 2019, pp. 6-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Jan. 22, 2019, pp. 1-40.
"Understanding OpenShift Container Platform development", https://docs.openshift.com/container-platform/4.1/architecture/understanding-development.html retrieved May 27, 2022 relevant to OpenShift Container Platform 4.1 general availability Jun. 4, 2019, pp. 1-18.
"Video—Intro to IBM Edge Application Manager", IBM https://www.IBM.com/cloud/blog/intro-to-IBM-edge-application-manager, May 13, 2020, pp. 1-16.
"VMware Announces VMware Tanzu Portfolio to Transform the Way Enterprises Build, Run and Manage Software on Kubernetes", VMware News & Stories https://news.vmware.com/releases/vmware-announces-vmware-tanzu-portfolio-to-transform-the-way-enterprises-build-run-and-manage-software-on-kubernetes, Aug. 26, 2019, pp. 1-11.
"VMware Enterprise PKS Architecture Overview", YouTube https://www.youtube.com/watch?v=504FGHukY8Y, Feb. 9, 2018, pp. 1.
"VMware Tanzu Mission Control Demo", YouTube https://www.youtube.com/watch?v=7m9S4HilJlo, Aug. 28, 2019, pp. 1.
"VMware Workspace ONE Access: Feature Walk-through", YouTube | https://www.youtube.com/watch?v=LGQRUe2vKWs, Feb. 19, 2020, pp. 1.
"Welcome to Azure Arc", YouTube, Microsoft Azure https://www.youtube.com/watch?v=3zdJJ97pNT4, Feb. 19, 2020, pp. 1.
"What is Anthos Service Mesh?", Google Cloud | Anthos Service Mesh 1.4 https://cloud.google.com/service-mesh/v1.4/docs/overview, Dec. 20, 2019, pp. 1-4.
"What is Anthos?", YouTube | Google Cloud Tech https://www.youtube.com/watch?v=Qtwt7QcW4J8, Apr. 21, 2020, pp. 1.
"What is AWS IoT?", AWS | Youtube: https://www.youtube.com/watch?v=WAp6FHbhYCk&ab_channel=AmazonWebServices; Timestamp 4:55/10:08, Jan. 2018.
"What is IoT Edge?", Code Project https://www.codeproject.com/Articles/1261285/What-is-IoT-Edge, Sep. 2018, pp. 1-9.
Abadi, , "TensorFlow: Large-Scale Machine Learning on Heterogeneous Distributed Systems", Preliminary White Paper, http://download.tensorflow.org/paper/whitepaper2015.pdf, Nov. 9, 2015, pp. 1-19.
Avram, Abel , "AWS Greengrass Runs Lambda Functions on IoT Devices", InfoQ | https://www.infoq.com/news/2017/06/aws-greengrass/, Jun. 8, 2017, pp. 1-2.
Balkan, Ahmet A. , "What's new in Cloud Run for Anthos", Google Cloud https://cloud.google.com/blog/products/serverless/new-features-in-cloud-run-for-anthos-ga, Dec. 11, 2019, pp. 1-7.
Banka, Roank , "Pivotal CloudFoundry on Google cloud platform", Slideshare https://www.slideshare.net/RonakBanka/pcfgcpgoogleioextended, Jul. 16, 2018, pp. 1-44.
Beguelin, , "Turn Your Smartphone into an IoT Device", "IBM Developer https://developer.IBM.com/tutorials/iot-mobile-phone-iot-device-bluemix-apps-trs/", Nov. 10, 2015, pp. 1-12.
Ben-David, Jacob , "Google Cloud's Anthos—Everything You Need To Know", Turbonomic Blog https://blog.turbonomic.com/google-clouds-anthos, Apr. 15, 2019, pp. 1-9.
Benson, Mark , "Technical Introduction to VMware Unified Access Gateway for Horizon Secure Remote Access", VMWare | https://blogs.vmware.com/euc/2015/09/what-is-vmware-unified-access-gateway-secure-remote-access.html, Sep. 9, 2015, pp. 8.
Cano, Ignacio et al., "Curator: Self-Managing Storage for Enterprise Clusters", University of Washington, Mar. 2017, pp. all.
Carey, Scott , "The major hybrid cloud options compared: AWS Outposts vs Azure Stack vs Google Anthos", ComputerWorld https://www.computerworld.com/article/3428108/the-major-hybrid-cloud-options-compared-aws-outposts-vs-azure-stack-vs-google-anthos.html, Nov. 6, 2019, pp. 1-9.
Chi, Chrissie , "Enabling more device management scenarios with new features in IoT Hub", Microsoft Azure | https://azure.microsoft.com/en-US/blog/enabling-more-device-management-scenarios-with-new-features-in-iot-hub/, May 7, 2018, pp. 1-6.
Foley, Mike , "vSphere 7—Introduction to the vSphere Pod Service", VMWare | https://blogs.vmware.com/vsphere/2020/04/vsphere-7-vsphere-pod-service.html, Apr. 9, 2020, pp. 8.
Goldsborough, , "A Tour of TensorFlow: Proseminar Data Mining", Technische Universität München, https://arxiv.org/pdf/1610.01178.pdf, Oct. 2016, pp. 1-16.
Goodison, Donna , "Google Cloud Unleashes Managed Service Mesh, Serverless For Anthos", The Channel Co. CRN https://www.crn.com/news/cloud/google-cloud-unleashes-managed-service-mesh-serverless-for-anthos, Sep. 16, 2019, pp. 1-6.
Grammatikou, , "GEMBus as a Service Oriented Platform for Cloud-Based Composable Services", 2011 IEEE Third International Conference on Cloud Computing Technology and Science, Nov. 1, 2011, pp. 666-671.
Hagoort, Niels , "vSphere 7—A Closer Look at the VM DRS Score", VMWare | https://blogs.vmware.com/vsphere/2020/05/vsphere-7-a-closer-look-at-the-vm-drs-score.html, May 21, 2020, pp. 8.
Hagoort, Niels , "vSphere 7—Assignable Hardware", VMWare https://blogs.vmware.com/vsphere/2020/03/vsphere-7-assignable-hardware.html, Mar. 31, 2020, pp. 7.
Hagoort, Niels , "vSphere 7—Improved DRS", VMWare | https://blogs.vmware.com/vsphere/2020/03/vsphere-7-improved-drs.html, Mar. 25, 2020, pp. 8.
Hermann, , "Meet Michelangelo: Uber's Machine Learning Platform", Uber Engineering, https://eng.uber.com/michelangelo-machine-learning-platform/, Sep. 5, 2017, pp. 1-17.
Hoare, , "A Semantic-Agent Framework for PaaS Interoperability", 2016 International IEEE Conferences on Ubiquitous Intelligence & Computing, Advanced and Trusted Computing, Scalable Computing and Communications, Cloud and Big Data Computing, Internet of People, and Smart World Congress, Jul. 18, 2016, pp. 788-793.
Holzle, Urs et al., "Introducing Anthos: An entirely new platform for managing applications in today's multi-cloud world", Google Cloud Blog https://cloud.google.com/blog/topics/hybrid-cloud/new-platform-for-managing-applications-in-todays-multi-cloud-world, Apr. 9, 2019, pp. 1-6.
Holzle, Urs et al., "Introducing Anthos: An entirely new platform for managing applications in today's multi-cloud world", Google Cloud https://cloud.google.com/blog/topics/hybrid-cloud/new-platform-for-managing-applications-in-todays-multi-cloud-world, Apr. 9, 2019, pp. 1-7.
Islam, Tariq et al., "5 frequently asked questions about Google Cloud Anthos", Google Cloud https://cloud.google.com/blog/topics/hybrid-cloud/5-frequently-asked-questions-about-google-cloud-anthos, Jun. 20, 2019, pp. 1-5.
Iyengar, Ashok , "Analytics at the Edge", https://www.ibm.com/cloud/blog/analytics-at-the-edge, Jun. 8, 2020, pp. 1-13.
Iyengar, Ashok , "Architecting at the Edge", https://www.ibm.com/cloud/blog/architecting-at-the-edge, Oct. 21, 2019, pp. 1-14.

(56) References Cited

OTHER PUBLICATIONS

Iyengar, Ashok et al., "Architectural Decisions at the Edge", https://www.ibm.com/cloud/blog/architectural-decisions-at-the-edge, Jul. 26, 2019, pp. 1-16.

Iyengar, Ashok et al., "Automation at the Edge", https://www.ibm.com/cloud/blog/automation-at-the-edge, Feb. 18, 2017, pp. 1-13.

Iyengar, Ashok , "Cloud at the Edge", https://www.ibm.com/cloud/blog/cloud-at-the-edge, Feb. 26, 2019, pp. 1-9.

Iyengar, Ashok , "DevOps at the Edge", https://www.ibm.com/cloud/blog/devops-at-the-edge, Dec. 3, 2015, pp. 1-13.

Iyengar, Ashok , "GitOps at the Edge", https://www.ibm.com/cloud/blog/gitops-at-the-edge, Nov. 2, 2017, pp. 1-13.

Iyengar, Ashok et al., "Models Deployed at the Edge", https://www.ibm.com/cloud/blog/models-deployed-at-the-edge, Mar. 30, 2020, pp. 1-17.

Iyengar, Ashok , "Policies at the Edge", https://www.ibm.com/cloud/blog/policies-at-the-edge, Jan. 22, 2020, pp. 1-13.

Iyengar, Ashok et al., "Rounding Out the Edges", https://www.ibm.com/cloud/blog/rounding-out-the-edges, May 7, 2019, pp. 1-11.

Iyengar, Ashok , "Security at the Edge", https://www.ibm.com/cloud/blog/security-at-the-edge, May 12, 2020, pp. 1-17.

Jain, , "Dynamic Space-Time Scheduling for GPU Inference", Massachusetts Institute of Technology, University of California, Berkeley; http://learningsys.org/nips18/assets/papers/102CameraReadySubmissionGPU_Virtualization%20(8).pdf, Dec. 31, 2018, pp. 1-8.

Khaddar, , "Smartphone: the Ultimate IoT and IoE Device", IntechOpen, "Smartphones from an Applied Research Perspective", http://dx.doi.org/10.5772/intechopen.69734, Nov. 2, 2017, pp. 137-162 (Ch. 7).

Lacoste, , "User-Centric Security And Dependability in the Clouds-of-Clouds", IEEE Cloud Computing, Sep. 2016, 64-75.

Lee, Brandon , "What is VMware vSphere 7 Assignable Hardware?", https://www.virtualizationhowto.com/2020/06/what-is-vmware-vsphere-7-assignable-hardware/, Jun. 25, 2020, pp. 8.

Lewis, Sarah , "Cloudify", TechTarget https://www.techtarget.com/searchcloudcomputing/definition/Cloudify, United Lex Competitive Analysis Report, Jun. 2019, pp. 1.

Li, , "Scaling Machine Learning as a Service", Uber Technologies, Inc., JMLR: Workshop and Conference Proceeding, http://proceedings.mlr.press/v67/li17a/li17a.pdf, Jun. 19-24, 2016, pp. 16-29.

Lin, Jennifer et al., "Anthos simplifies application modernization with managed service mesh and serverless for your hybrid cloud", Google Cloud https://cloud.google.com/blog/topics/hybrid-cloud/anthos-simplifies-application-modernization-with-managed-service-mesh-and-serverless-for-your-hybrid-cloud, Sep. 16, 2019, pp. 1-6.

Lobo, Savia , "Microsoft Azure IoT Edge is open source and generally available!", PacktHub | https://hub.packtpub.com/microsoft-azure-iot-edge-is-open-source-and-generally-available/, Jun. 29, 2018, pp. 1-2.

Mahajan, , "Themis: Fair and Efficient GPU Cluster Scheduling", Cornell University, ARXIV:1907.01484 [CS.DC], Oct. 29, 2019, 15 pages.

Malasi, Aman , "Google Anthos: Write Once, Run Anywhere", HCL Tech Blogs https://www.hcltech.com/blogs/google-anthos-write-once-run-anywhere, Aug. 26, 2019, pp. 1-2.

Marko, Kurt , "SAP to the fore as Cloud Foundry grows into the preferred platform for cloud-native enterprise apps", Diginomica https://diginomica.com/cloud-foundry-growing-preferred-platform-cloud-native-enterprise-applications, Jun. 19, 2017, pp. 1-10.

McConville, Anton et al., "A brief history of Kubernetes, OpenShift, and IBM", IBM Developer Blog | https://developer.ibm.com/blogs/a-brief-history-of-red-hat-openshift/, Aug. 1, 2019, pp. 9.

McLuckie, Craig , "Introducing VMware Tanzu Mission Control to Bring Order to Cluster Chaos", VMware Tanzu https://tanzu.vmware.com/content/blog/introducing-vmware-tanzu-mission-control-to-bring-order-to-cluster-chaos, Aug. 26, 2019, pp. 1-6.

Menezes, Alexandre , "Introduction to Security Contexts and SCCs", Red Hat | https://cloud.redhat.com/blog/introduction-to-security-contexts-and-sccs, Mar. 16, 2020, pp. 7.

Mijumbi, et al., "Learning Algorithms for Dynamic Resource Allocation in Virtualised Networks", Proceedings of Workshop on Management of Large Scale Virtualized Infrastructures: Smart Data Acquisition, Analysis and Network and Service Management in the Future Internet, 2014, 4 pages.

Mohamed, Riaz , "Deploy Cloud Agnostic Applications with VMware vRealize Automation Cloud", VMWare Cloud Management https://blogs.vmware.com/management/2019/09/cloud-agnostic-apps-vra-cloud.html, Sep. 17, 2019, pp. 1-10.

Morabito, Roberto et al., "A Framework Based on SDN and Containers for Dynamic Service Chains on IoT Gateways", Proceedings of the Workshop on Hot Topics in Container Networking and Networked Systems. Ericsson Research, NomadicLab, https://dl.acm.org/doi/pdf/10.1145/3094405.3094413, Aug. 11, 2017, pp. 42-47.

MSV, Janakiram , "5 Reasons Why Azure IoT Edge is Industry's Most Promising Edge Computing Platform", Forbes | https://www.forbes.com/sites/janakirammsv/2018/07/01/5-reasons-why-azure-iot-edge-is-industrys-most-promising-edge-computing-platform/?sh=56b9ef223249, Jul. 2, 2018, pp. 1-5.

MSV, Janakiram , "Azure IoT Edge: A Technology Primer", TheNewsStack | https://thenewstack.io/azure-iot-edge-a-technology-primer/, Sep. 14, 2018, pp. 1-9.

MSV, Janakiram , "Google Forays into Edge Computing with Cloud IoT Edge and TPU", Forbes https://www.forbes.com/sites/janakirammsv/2018/07/30/google-forays-into-edge-computing-through-cloud-iot-edge-and-tpu/?sh=5e68b3fc6005, Jul. 30, 2018, pp. 1-4.

MSV, Janakiram , "Why Azure Arc is a Game Changer for Microsoft", Forbes https://www.forbes.com/sites/janakirammsv/2019/11/05/why-azure-arc-is-a-game-changer-for-microsoft/?sh=373f5c854307, Nov. 5, 2019, pp. 1-10.

O'Keefe, Megan , "Welcome to the service mesh era: Introducing a new Istio blog post series", Google Cloud https://cloud.google.com/blog/products/networking/welcome-to-the-service-mesh-era-introducing-a-new-istio-blog-post-series, Jan. 22, 2019, pp. 1-5.

Oleniczak, Kevin , "Using AWS IoT for Predictive Maintenance", AWS | https://aws.amazon.com/blogs/iot/using-aws-iot-for-predictive-maintenance/, Jun. 28, 2018, pp. 1-6.

Paladi, Nicolae et al., "Domain Based Storage Protection with Secure Access Control for the Cloud", https://dl.acm.org/doi/pdf/10.1145/2600075.2600082, 2014, pp. 35-42.

Param, Sunil , "Google's Coral: A new product development platform with local AI", TechGig | https://content.techgig.com/technology/googles-coral-a-new-product-development-platform-with-local-ai/articleshow/69042955.cms, Apr. 26, 2019, pp. 1-18.

Poccia, Danilo , "New—AWS IoT Greengrass Adds Container Support and Management of Data Streams at the Edge", AWS | AWS News Blog https://aws.amazon.com/blogs/aws/new-aws-iot-greengrass-adds-docker-support-and-streams-management-at-the-edge/, Nov. 25, 2019, pp. 1-7.

Poitras, Steven , "The Nutanix Bible", http://stevenpoitras.com/the-nutanix-bible/ (Publication date based on indicated capture date by Archive.org; first publication date unknown), Jan. 11, 2014, pp. all.

Poitras, Steven , "The Nutanix Bible", https://nutanixbible.com/, Jan. 12, 2016, pp. all.

Poitras, Steven , "The Nutanix Bible", https://nutanixbible.com/, Jan. 3, 2017, pp. all.

Poitras, Steven , "The Nutanix Bible", https://nutanixbible.com/, Jan. 3, 2018, pp. all.

Poitras, Steven , "The Nutanix Bible", http://stevenpoitras.com/the-nutanix-bible/ (Publication date based on indicated capture date by Archive.org; first publication date unknown), Jan. 7, 2015, pp. all.

Poitras, Steven , "The Nutanix Bible", https://nutanixbible.com/, Jan. 8, 2019, pp. all.

Poitras, Steven , "The Nutanix Bible", https://nutanixbible.com/, Jul. 25, 2019, pp. all.

Poitras, Steven , "The Nutanix Bible", http://stevenpoitras.com/the-nutanix-bible/ (Publication date based on indicated capture date by Archive.org; first publication date unknown), Jun. 20, 2014, pp. all.

Poitras, Steven , "The Nutanix Bible", https://nutanixbible.com/, Jun. 25, 2018, pp. all.

(56) References Cited

OTHER PUBLICATIONS

Poitras, Steven, "The Nutanix Bible", https://nutanixbible.com/, Jun. 8, 2017, pp. all.
Poitras, Steven, "The Nutanix Bible", http://stevenpoitras.com/the-nutanix-bible/ (Publication date based on indicated capture date by Archive.org; first publication date unknown), Jun. 9, 2015, pp. all.
Poitras, Steven, "The Nutanix Bible", https://nutanixbible.com/, Jun. 9, 2016, pp. all.
Poitras, Steven, "The Nutanix Bible", https://nutanixbible.com/, Mar. 2, 2020, pp. all.
Poitras, Steven, "The Nutanix Bible", https://nutanixbible.com/, Mar. 3, 2020, pp. all.
Poitras, Steven, "The Nutanix Bible", http://stevenpoitras.com/the-nutanix-bible/ (Publication date based on indicated capture date by Archive.org; first publication date unknown), Oct. 15, 2013, pp. all.
Poitras, Steven, "The Nutanix Bible", https://nutanixbible.com/, Sep. 17, 2019, pp. all.
Poitras, Steven, "The Nutanix Bible", https://nutanixbible.com/, Sep. 4, 2015, pp. all.
Rafique, , "Towards Portability and Interoperability Support in Middleware for Hybrid Clouds", 2014 IEEE Infocom Workshop on Cross-Cloud Systems, Apr. 27, 2014, pp. 7-12.
Reid, Nate, "Upgrading VMware Enterprise PKS 1.2 to 1.3", YouTube https://www.youtube.com/watch?v=7pAxNWIxVLM, Jan. 28, 2019, pp. 1.
Rhee, Injong, "Bringing intelligence to the edge with Cloud IoT", Google Cloud | https://cloud.google.com/blog/products/gcp/bringing-intelligence-edge-cloud-iot, Jul. 25, 2018, pp. 1-7.
Rosoff, Jared, "Project Pacific—Technical Overview", VMWare | https://blogs.vmware.com/vsphere/2019/08/project-pacific-technical-overview.html, Aug. 26, 2019, pp. 7.
Schonbaum, Iftach, "Anthos—Google's Enterprise Hybrid & Multi-Cloud Platform", CloudZone https://medium.com/cloudzone/anthos-googles-enterprise-hybrid-multi-cloud-platform-7975e05a7729, Apr. 23, 2019, pp. 1-7.
Stakun, Jaroslaw, "Introduction to Red Hat OpenShift Container Platform", Open Virtualization Pro https://www.openvirtualization.pro/red-hat-openshift-container-platform/, Apr. 26, 2019, pp. 1.
Stoks, , "Workspace IoT Series: How Industry 4.0 Will Transform Your Mobile Strategy", "VMware End-User Computing Blog https://blogs.vmware.com/euc/2019/02/workspace-iot-mobile-strategy.html", Feb. 20, 2019, pp. 1-5.
Sun, , "Towards Distributed Machine Learning in Shared Clusters: a Dynamically-Partitioned Approach", Cornell University: Arxiv: 1704.06738V1 [CS.CD], Apr. 22, 2017, 6 pages.
Tamura, Yoshi, "GPUs as a service with Kubernetes Engine are now generally available", Google Cloud | https://cloud.google.com/blog/products/gcp/gpus-service-kubernetes-engine-are-now-generally-available, Jun. 19, 2018, pp. 5.
Vanderzyden, John, "Using AWS Greengrass to Enable IoT Edge Computing", mabl | https://www.mabl.com/blog/using-aws-greengrass-enable-iot-edge-computing, Aug. 23, 2017, pp. 1-12.
Warburton, , "An Intro to GPU Architecture and Programming Models I Tim Warburton, Virginia Tech", YouTube, Argonne National Laboratory Training, https://www.youtube.com/watch?v=IGmPy8xpT4E, Sep. 25, 2017, pp. 1-3.
Wiggers, Kyle, "Microsoft launches Azure IoT Edge out of preview", VentureBeat | https://venturebeat.com/mobile/microsoft-launches-azure-iot-edge-out-of-preview/, Jun. 27, 2018, pp. 1-6.
Wiggers, Steef-Jan, "Google Cloud Platform Release Edge TPU and Cloud IoT Edge", InfoQ https://www.infoq.com/news/2018/07/google-iot-edge-tpu-ai/, Jul. 30, 2018, pp. 1-4.
Wiggers, Steef-Jan, "Google Kubernetes Engine 1.10 is Generally Available and Enterprise Ready", InfoQ | https://www.infoq.com/news/2018/06/google-kubernetes-engine-1.10-ga, Jun. 1, 2018, pp. 4.
Yamashita, Teppei, "Real-time data processing with IoT Core", Google Cloud | https://cloud.google.com/community/tutorials/cloud-iot-rtdp, Apr. 2018, pp. 1-19.
Zhang, Xinyi, "Create a CI/CD pipeline for your IoT Edge solution with Azure DevOps", Microsoft | https://devblogs.microsoft.com/iotdev/create-a-ci-cd-pipeline-for-your-iot-edge-solution-with-azure-devops/, Oct. 29, 2018, pp. 1-10.
Zhao, Zhuoran, et al., "DeepThings: Distributed Adaptive Deep Learning Inference on Resource-Constrained IoT Edge Clusters", IEEE Transactions on Computer-Aided Design of Integrated Circuits and Systems, vol. 37, No. 11 | doi: 10.1109/TCAD.2018.2858384., Nov. 2018, pp. 2348-2359.
"Cloud, Fog and Edge Computing—What's the Difference?", https://www.winsystems.com/cloud-fog-and-edge-computing-whats-the-difference/, Dec. 4, 2017, pp. 1-10.
"IoT: Understanding the shift from cloud to edge computing", https://internetofbusiness.com/shift-from-cloud-to-edge-computing/, Aug. 14, 2018, pp. 1-9.
Ai, Yuan, et al., "Edge computing technologies for Internet of Things: a primer", Digital Communications and Networks 4 | https://doi.org/10.1016/j.dcan.2017.07.001, 2018, pp. 77-86.
O'Keefe, Megan, "Edge Computing and the Cloud-Native Ecosystem", TheNewStack | https://thenewstack.io/edge-computing-and-the-cloud-native-ecosystem/, Apr. 18, 2018, pp. 1-11.
Ren, Ju, et al., "Edge Computing for the Internet of Things", IEEE Journals & Magazine | vol. 32 Issue: 1, 2008, pp. 1-6.
U.S. Appl. No. 18/321,678 titled "Generic Proxy Endpoints Using Protocol Tunnels Including Life Cyclemanagement and Examples for Distributed Cloud Native Services Andapplications" filed May 22, 2023.
"Backup & Secure", USGS, 2018.
"Cascade Mode Deployment", https://docs.vmware.com/en/Unified-Access-Gateway/3.10/com.vmware.uag-310-deploy-config.doc/guid-awt-deployment-cascade.html#guid-awt-deployment-cascade, Jul. 2, 2019, pp. 2.
Angelas, "Java Heap Space vs. Stack Memory: How Java Applications Allocate Memory", stackify.com, Sep. 5, 2017, pp. 1-3.
"Mobile Content Management- Datasheet", https://www.vmware.com/content/dam/digitalmarketing/vmware/en/pdf/workspace-one/vmware-airwatch-mcm-datasheet.pdf, Mar. 12, 2019, pp. 4.
"Runtime System", Wikipedia, 2018.
"Tunnel Architecture", https://techzone.vmware.com/resource/workspace-one-uem-architecture#tunnel-architecture, Apr. 17, 2019, pp. 24.
"Unified App Catalog", https://techzone.vmware.com/resource/workspace-one-uem-architecture#unified-app-catalog, Apr. 17, 2019, pp. 24.
"Using the Workspace One UEM Rest API to Extend Device Compliance Parameters", https://techzone.vmware.com/resource/workspace-one-uem-architecture#using-the-workspace-one-uem-rest-api-to-extend-device-compliance-parameters, Apr. 17, 2019, pp. 24.
"VMware Identity Manager API", https://developer.vmware.com/apis/57/#api, Aug. 2018, pp. 2.
"VMware Tanzu Service Mesh built on VMware NSX", VMware | https://www.vmware.com/content/dam/digitalmarketing/vmware/en/pdf/docs/vmw-tanzu-service-mesh-solution-brief.pdf, Mar. 2020, pp. 3.
"VMware Tunnel", https://techzone.vmware.com/resource/workspace-one-uem-architecture#vmware-tunnel, Apr. 17, 2019, pp. 24.
"VMware Tunnel (Per-App VPN) Connections in Cascade Mode", https://docs.vmware.com/en/Unified-Access-Gateway/3.10/com.vmware.uag-310-deploy-config.doc/GUID-B69DD1E7-ED88-4574-912C-DBA071BC9D6F.html, May 31, 2019, pp. 2.
"VMware Unified Access Gateway: Use Cases—Feature Walkthrough", https://www.youtube.com/watch?v=xaN9mYOJqAs, Oct. 27, 2017, pp. 1.
"Workspace One UEM 1810 introduces support for Android Enterprise fully managed devices with work profiles", https://bayton.org/blog/2018/10/workspace-one-uem-1810-introduces-support-for-android-enterprise-fully-managed-devices-with-work-profiles/, Oct. 29, 2018, pp. 11.
Bayton, Jason, "Android Enterprise COPE enrolment comparison: WS1 UEM / MI Core", https://www.youtube.com/watch?v=QSJu3xFzjMw, Oct. 28, 2018, pp. 1.

(56) References Cited

OTHER PUBLICATIONS

Beltre, Angel, et al., "Enabling HPC workloads on Cloud Infrastructure using Kubernetes Container Orchestration Mechanisms", 2019 IEEE/ACM Workshop on Containers and New Orchestration Paradigms for Isolated Environments in HPC (Canopiehpc), 2019, pp. 11-20.

Coronado, Jose, "Deploying Tanzu Application Service for Kubernetes on Kind", VMware Tanzu | https://vxcoronado.net/index.php/2020/05/31/deploying-tanzu-application-service-for-kubernetes-on-kind/, May 31, 2020, pp. 8.

Harnik, Danny, et al., "Secure Access Mechanism for Cloud Storage", vol. 12, No. 3, pp. 317-336. [Retrieved from internet on Feb. 14, 2023], <https://scpe.org/index.php/scpe/article/view/727>, 2011, pp. 317-336.

Poitras, Steven, "The Nutanix Bible", https://nutanixbible.com/, Apr. 9, 2019, pp. all.

Schweighhardt, Mark, "VMware Tanzu Service Mesh, built on VMware NSX is Now Available!", VMware | https://blogs.vmware.com/networkvirtualization/2020/03/vmware-tanzu-service-mesh-built-on-vmware-nsx-is-now-available.html/, Mar. 10, 2020, pp. 8.

Warke, Amit, et al., "Storage Service Orchestration with Container Elasticity", 2018 IEEE 4th International Conference on Collaboration and Internet Computing DOI 10.1109/CIC.2018.00046, 2018, pp. 283-292.

\* cited by examiner

APPARATUS AND METHOD FOR DEPLOYING A MOBILE DEVICE AS A DATA SOURCE

CROSS REFERENCE TO RELATED APPLICATION(S)

This application is a divisional of U.S. application Ser. No. 16/920,235 filed Jul. 2, 2020, which claims priority to provisional application No. 62/870,313, filed Jul. 3, 2019, which are hereby incorporated by reference in their entirety for any purpose.

BACKGROUND

Internet of Things (IoT) systems are increasing in popularity. Generally, IoT systems utilize a number of edge devices, which may be deployed about an environment (which may be a wide geographic area in some examples). Edge systems connected to various data sources that are generally proximate the edge device to receive and process data from the data sources. One way to enhance or expand available data sources may be to leverage input or output components of mobile devices. However, adding a mobile device as a data source may be difficult, as mobile devices have a wide array of hardware configurations, available input and output devices, and processing capabilities. Thus, adding a mobile device as a data source may present complexities that prevent wide adoption of use of mobile devices as data sources in an IoT system.

DETAILED DESCRIPTION

Figure 1:
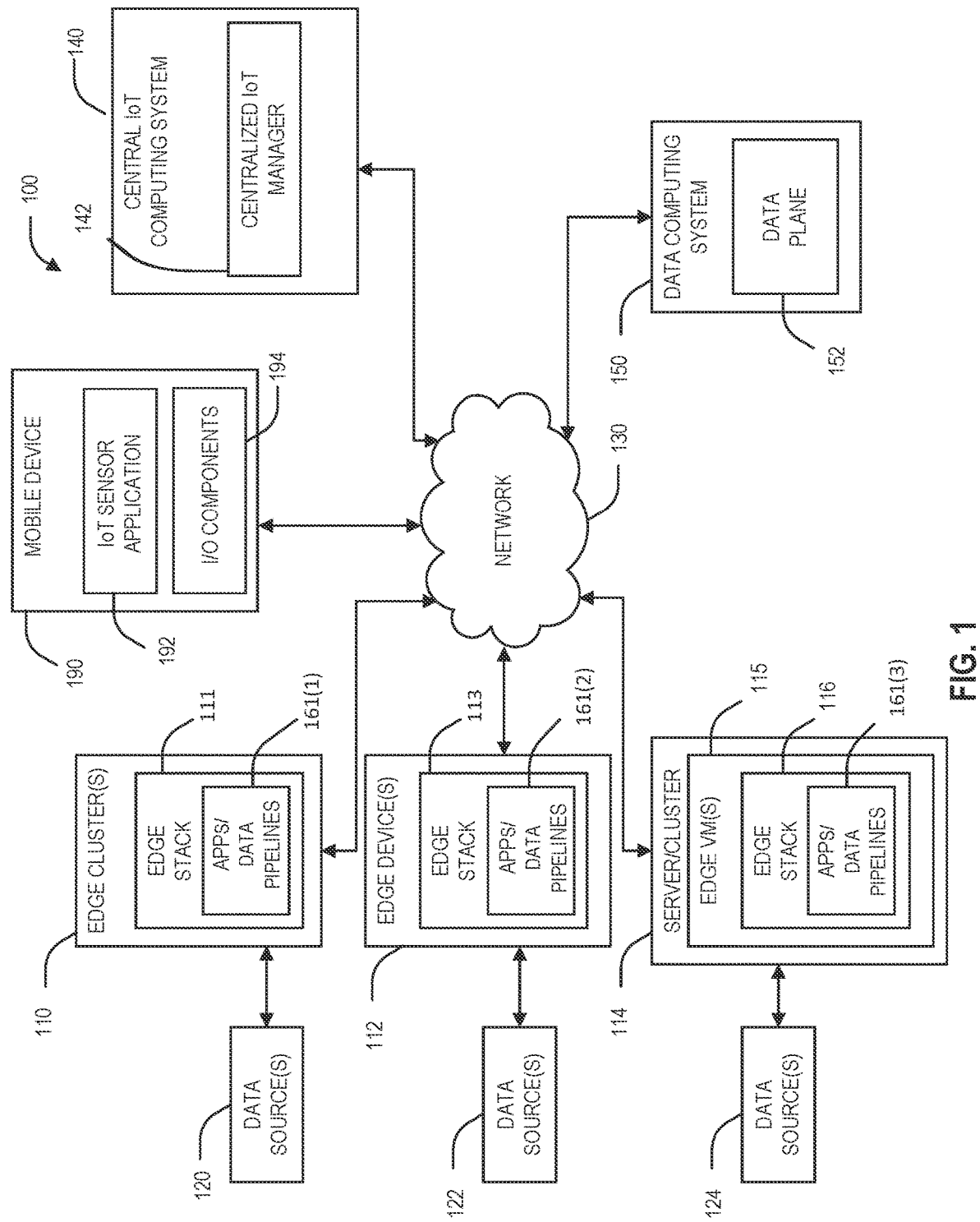
FIG. 1 is a block diagram of an Internet of Things system, in accordance with an embodiment of the present disclosure.

This disclosure relates to an Internet of Things (IoT) system and includes an IoT sensor application hosted on a mobile device that configures the mobile device as a data sensor or source. The IoT sensor application may be configured to provide an interface between an input (e.g., a camera, a microphone, GPS, motion sensor, etc.) or output (e.g., a display or screen, a speaker, another type of transmitter, etc.) component of the mobile device and a data pipeline or application and/or to cloud data storage associated with an IoT system. In one example, the IoT sensor application may configure the mobile device as an input data source of the IoT system. In another example, the IoT sensor application may configure the mobile device as an output data source of the IoT system to receive playback of the captured data after processing by one or more applications and/or data pipelines of the IoT system. That is, the IoT sensor application may automatically configure the mobile device to be an output data source without having to understand detailed operation of the data pipeline or application to which the output data source is connected. When started, the IoT sensor application may connect to an edge device of the IoT system and search for a data source identifier associated with the type of input or output component, and corresponding application(s) and/or data pipeline(s) to which the data source is connected. In some examples, if one or more input or output component(s) are made available to the IoT sensor application, the IoT sensor application may automatically connected to one or more data pipeline output data sources that meet the criteria for the enabled one or more input or output components. In examples where more than one relevant edge device, more than one relevant data source, more than one relevant application and/or data pipeline, etc. are available, the IoT sensor application may prompt a user to select each component. In other examples, the IoT sensor application may automatically select one or more of the components. The IoT sensor application may be configured to determine whether a selected data source is currently in use by another user or is free, and may alert a user if it is in use. In some examples, the IoT sensor application may be configured to alert the user if a selected data source is not connected to an application or data pipeline In some examples, the IoT sensor application may be configured to alert the user if a selected application or data pipeline is not currently running. In some examples, the IoT sensor application may be prompt the IoT system to start a selected application or data pipeline if the IoT sensor application detects that the selected application or data pipeline is not currently running.

Using the identified edge device and the detected application or data pipeline, the IoT sensor application may be configured to capture live data via the input component of the mobile device and upload to IoT system. The IoT sensor application may be configured to upload a stream of video data from the camera of the mobile device to the application or data pipeline of the IoT system for storage and/or further processing of the data. In some examples, in addition to uploading captured live data, the IoT sensor application may also be configured to upload previously captured data (e.g., a stored video or photo) to the IoT system for storage and/or further processing. The applications and data pipelines may be hosted on one or more edge devices and may be configured to process the data based on installed functions, such as artificial intelligence (AI) inferences. In other examples, the data output from the applications and data pipelines may be further uploaded to a cloud computing system for further processing and/or storage. In some examples, the IoT sensor application may also be configured to run an artificial intelligence (AI) inference to process the captured data before uploading to the IoT system. The IoT sensor application may be configured to identify an output of the application or data pipeline to receive a live stream playback of the captured data after processing. The live stream may be received using HTTP protocol using uniform resource locators (URLs). In some examples, the playback communication between the IoT system and the IoT sensor application may include security protocols, such as URLs with expiry controls. The IoT sensor application may also be able to identify a final storage location of the captured data after processing by the application or data pipeline in order to download the data for consumption or playback at a later time. The IoT sensor application may also save the captured data to a shared library for consumption by other mobile or other computing devices. At least one benefit of the IoT sensor application is to provide an interface that is able to automatically query all available applications or data pipelines of a particular category based on the input, output, and storage components made available on the mobile device hosting the IoT sensor application, rather than having to manually discover available applications or data pipelines.

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

FIG. 1 is a block diagram of an Internet of Things (IoT) system 100, in accordance with an embodiment of the present disclosure. The IoT system 100 may include one or more of any of edge cluster(s) 110 coupled to respective data source(s) 120, edge device(s) 112 coupled to respective data source(s) 122, a server/cluster 114 coupled to respective data source(s) 124 and configured to host one or more edge virtual machines VM(s) 115. The IoT system 100 may further include a central IoT computing system 140 coupled to the one or more of the edge cluster(s) 110, the edge device(s) 112, and/or the edge VM(s) 115 hosted on the server/cluster 114 via a network 130 to manage configuration and operation of the IoT system 100. The IoT system 100 may further include a data computing system 150 coupled to the network 130 to configured to receive, store, process, etc., data received from the one or more of the edge cluster(s) 110, the edge device(s) 112, and/or the server/cluster 114 via a network 130. The IoT system 100 may further include one or more mobile device(s) 190 having one or more I/O components 194 and configured to host an IoT sensor application 192.

The network 130 may include any type of network capable of routing data transmissions from one network device (e.g., the edge cluster(s) 110, the edge device(s) 112, the server/cluster 114, a computing node of the central IoT computing system 140, and/or a computing node of the data computing system 150) to another. For example, the network 130 may include a local area network (LAN), wide area network (WAN), intranet, or a combination thereof. The network 130 may include a wired network, a wireless network, or a combination thereof.

The IoT system 100 may include one or more types of edge systems selected from any combination of the edge cluster(s) 110, the edge device(s) 112, and/or the edge VM(s) 115 hosted on the server/cluster 114. Each of the edge cluster(s) (e.g., or tenants) 110 may include a respective cluster of edge nodes or devices that are configured to host a respective edge stack 111. The edge stack 111 may be distributed across multiple edge nodes, devices, or VMs of a respective one of the edge cluster(s) 110, in some examples. Each of the edge device(s) 112 may be configured to host a respective edge stack 113. Each of the edge VM(s) 115 may be configured to host a respective edge stack 116. In some examples, the server/cluster 114 may be included as part of the central IoT computing system 140 or the data computing system 150. For clarity, "edge system" may refer to any of the edge cluster(s) 110, the edge device(s) 112, and/or the edge VM(s) 115 hosted on the server/cluster 114. The edge stacks (e.g., any of the edge stack 111, the edge stack 113, and/or the edge stack 116) may include software configured to operate the respective edge system in communication between one or more of the respective data sources (e.g., the data source(s) 120, the data source(s) 122, and/or the data source(s) 124) and/or the mobile device 190. The software of the edge stack may include instructions that are stored on a computer readable medium (e.g., memory, disks, etc.) that are executable by one or more processor units (e.g., central processor units (CPUs), graphic processor units (GPUs), tensor processing units (TPUs), hardware accelerators, video processing units (VPUs), etc.) to perform functions, methods, etc., described herein.

The data source(s) 120, the data source(s) 122, and the data source(s) 124 ("data sources") may each include one or more devices configured to receive and/or generate respective source data. The data sources may include sensors (e.g., electrical, temperature, matter flow, movement, position, biometric data, or any other type of sensor), cameras, transducers, any type of RF receiver, output devices (e.g., displays, speakers, lights, RF transmitters, other types of transmitters, etc.), or any other type of device configured to generate source data and/or receive processed data.

In some examples, the IoT sensor application 192 may configure one or more of the I/O components 194 of the mobile device 190 as a data source within the IoT system, similar to the data source(s) 120, the data source(s) 122, and/or the data source(s) 124). For example, the IoT sensor application 292 may provide an interface between an input or output component of the I/O components 194 and one or more applications or data pipelines of the one or more applications and/or data pipelines 161(1)-(3) of the IoT system 100. To configure the mobile device 190 as an input data source, the IoT sensor application 192 may use one or more input components (e.g., a camera, a microphone, GPS, motion sensor, etc.) of the I/O components 194 of the mobile device 190 as a data source to provide data to a connected application or data pipeline of the one or more applications and/or data pipelines 161(1)-(3) of the IoT system 100. In some examples, the IoT sensor application may dynamically discover input components of the I/O components 194 available/enabled on the device 190 and may dynamically configure the mobile device 190 as an input data source by automatically discovering and connecting to one or more relevant input data sources attached to the one or more applications and/or data pipelines 161(1)-(3) of the IoT system 100. To configure the mobile device 190 as an output data source (e.g., to receive processed data from an application or data pipeline), the IoT sensor application 192 may use one or more output components (e.g., a display or screen, speaker, other type of transmitter, or combinations thereof).) of the I/O components 194 of the mobile device 190 as an output data source to receive processed data from a connected application or data pipeline of the one or more applications and/or data pipelines 161(1)-(3) of the IT system 100. In some examples, the IoT sensor application may dynamically discover output components of the I/O components 194 available/enabled on the device 190 and may dynamically configure the mobile device 190 as an output data source by automatically discovering and connecting to one or more relevant input data sources attached to the one or more applications and/or data pipelines 161(1)-(3) of the IoT system 100. In some examples, the IoT sensor application 192 may configure the mobile device 190 as both an input data source and an output data source of a connected application or data pipeline. The IoT sensor application 192 may request available edge systems from the control plane Each of the edge stacks 111, 113, and 116 may include a respective one or more applications and/or data pipelines 161(1)-(3). In some examples, some data pipelines and/or applications 161(1)-(3) may be configured to receive and process/transform source data from one or more of the data sources, other data pipelines, or combinations thereof. In some examples, a data pipeline may span across multiple edge systems. Each of the one or more applications and/or data pipelines 161(1)-(3) may be configured to process respective received data based on respective algorithms or functions to provide transformed data. The data pipelines can be constructed using computing primitives and building blocks, such as VMs, containers, processes, or any combination thereof. In some examples, the data pipelines may be constructed using a group of containers (e.g., a pod) that each perform various functions within the data pipeline (e.g., subscriber, data processor, publisher, connectors that transform data for consumption by another container within the application or pod, etc.) to consume, transform, and produce messages or data. In some examples, the definition of stages of a constructed data pipeline application may be described using a user interface or REST API, with data ingestion and movement handled by connector components built into the data pipeline. Thus, data may be passed between containers of a data pipeline using API calls.

In some examples, the edge systems may cause transformed data from a data pipeline or an application of the one or more applications and/or data pipelines 161(1)-(3) to be provided to a respective data plane as edge data, such as the data plane 152 of the data computing system 150, using respective data plane communication interfaces, including application programming interfaces (APIs). The data computing system 150 may be a dedicated computing system, or may include a centralized analytics system hosted on a network of remote servers that are configured to store, manage, and process data (e.g., cloud computing system).

The one or more applications and/or data pipelines 161(1)-(3) of the edge stacks may be implemented using a containerized architecture that is managed via a container orchestrator. The data pipelines and/or applications communicate using application programming interface (API) calls, in some examples.

The centralized IoT manager 142 hosted on the central IoT computing system 140 may be configured to centrally manage configuration of each of the edge systems and data sources via a central control plane. The centralized IoT manager 142 may be implemented, for example, utilizing software (e.g., computer readable media encoded with executable instructions) executed by one or more processors. The central IoT computing system 140 may include one or more computing nodes configured to host the centralized IoT manager 142 (e.g., provide processors with which to execute instructions for performing the IoT manager actions described herein). In some examples, the centralized IoT manager 142 may be distributed across a cluster of computing nodes of the central IoT computing system 140 (e.g., executable instructions may be executed by multiple processors which may be in communication as a cluster).

In some examples, the centralized IoT manager 142 may be configured to manage, for each of the edge systems, network configuration and security protocols, installed software (e.g., including data pipelines and applications), connected data source(s) (e.g., including type, category, identifiers, data communication protocols, etc.), connected data plane(s), communication between the edge systems and users, etc. The centralized IoT manager 142 may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

The centralized IoT manager 142 may be configured to generate (e.g., build, construct, update, etc.) and distribute data pipelines and applications to selected edge systems based on the configuration maintained for each edge system. In some examples, the centralized IoT manager 142 may facilitate creation of one or more project constructs and may facilitate association of a respective one or more edge systems with a particular project construct (e.g., in response to user input and/or in response to criteria or metadata of the particular project). Each edge systems may be associated with no project constructs, one project construct, or more than one project construct. A project construct may be associated with any number of edge systems. When a data pipeline is created, the centralized IoT manager 142 may assign the data pipeline to or associate the data pipeline with a respective one or more project constructs. In response to the assignment to or association with the respective one or more project constructs, the centralized IoT manager 142 may deploy the data pipeline to each edge system associated with the respective one or more project constructs.

For example, in response to a request for a new data pipeline associated with a particular type or category of data sources and/or a project construct, the centralized IoT manager 142 may identify data sources having the particular type or category (e.g., or attribute), and/or may identify respective edge systems are connected to the identified data sources of the particular type or category and/or are associated with the particular project construct. For each identified edge system, the centralized IoT manager 142 may generate a respective version of the application or data pipeline based on respective hardware configuration information for the edge system. That is, the centralized IoT manager 142 may independently generate the applications and data pipelines to efficiently operate according to the specific hardware configuration of each edge system.

In operation, the IoT system 100 may include any number and combination of data sources selected from the data source(s) 120, the data source(s) 122, and the data source(s) 124 that are ach configured to provide respective source data. The data sources of the IoT system 100 may collectively span any type of geographic area (e.g., across continents, countries, states, cities, counties, facilities, buildings, floors, rooms, systems, units, or any combination thereof). The number of data sources may range in the tens, hundreds, thousands, or more. The data sources may include sensors (e.g., electrical, temperature, matter flow, movement, position, biometric data, or any other type of sensor), cameras, transducers, any type of RF receiver, or any other type of device configured to receive and/or generate source data.

Rather than each of the data sources independently sending all source data directly to a data plane or user, the IoT system 100 may include any number and combination of edge systems selected from any combination of the edge cluster(s) 110, the edge device(s) 112, and/or the edge VM(s) 115 hosted on the server/cluster 114 that are proximately located with and connected to respective data sources and are each configured to receive and select/process/transform the source data that is provided to the data plane or user. The edge systems within the IoT system 100 may include homogenous hardware and software architectures, in some examples. In other examples, the edge systems have a wide array of hardware and software architectures and capabilities. Each of the edge systems may be connected to a respective subset of data sources, and may host respective data pipelines and applications (e.g., included in the edge stacks, such as the edge stack 111, edge stack 113, or edge stack 116) that are configured to process source data from a respective one or more of the connected data sources and/or transformed data from other applications and/or data pipelines.

Each of the one or more data pipelines and/or applications may be configured to process and/or distribute respective transformed data based on received source data (e.g., or other edge data) using respective algorithms or functions. In some examples, the algorithms or functions may include any other user-specified or defined function to process/transform/select/etc. received data. In some examples, an edge system may provide the transformed data from a data pipeline or an application of the one or more data pipelines or applications of the edge stacks to a respective destination data plane, such as the data plane 152 of the data computing system 150 as edge data. In some examples, the edge systems may be configured to share edge data with other edge systems. The one or more data pipelines or applications of the edge stacks may be implemented using a containerized architecture that is managed via a container orchestrator. The data pipelines and/or applications communicate using application programming interface (API) calls, in some examples.

In some examples, the edge systems may cause transformed data from a data pipeline or an application to be provided to a respective data plane as edge data, such as the data plane 152 of the data computing system 150, using respective data plane communication interfaces, including application programming interfaces (APIs). The data computing system 150 may be a dedicated computing system, or may include a centralized analytics system hosted on a network of remote servers that are configured to store, manage, and process data (e.g., cloud computing system). The centralized IoT manager 142 hosted on the central IoT computing system 140 may be configured to centrally manage configuration of each of the edge systems and data sources. In some examples, the centralized IoT manager 142 may be configured to manage, for each of the edge systems, data sources, and/or users, network configuration and security protocols, installed software (e.g., including data pipelines and applications), connected data source(s) (e.g., including type, category, identifiers, data communication protocols, etc.), connected data plane(s), etc. The centralized IoT manager 142 may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

In some examples, the IoT system 100 may include one or more of the mobile device 190 that are configured to host the IoT sensor application 192, which is configured to cause the mobile device 190 to be added as a data source within the IoT system 100. The IoT sensor application 192 may be implemented using executable instructions encoded on or more computer readable media and executable by one or more processor(s) of the mobile device. The mobile device 190 may communicate with one or more of the edge systems and/or the central IoT computing system 140 via the network 130, in some examples. The mobile device 190 may be configured to provide an interface between an input component (e.g., a camera, a microphone, GPS, motion sensor, etc.) of the I/O components 194 of the mobile device 190 and a data pipeline or application of the one or more applications and/or data pipelines 161(1)-(3) and/or to the data plane 152 to server as an input data source. In some examples, the IoT sensor application 192 may also configure the mobile device 190 as an output data source (e.g., a consumer of processed data) of the IoT system 100 to receive processed data after from one or more of the applications and/or data pipelines 161(1)-(3). Mobile devices described herein, such as mobile device 190 may be implemented using, for example, one or more smart phones, cell phones, smart speakers, automobiles, vehicles, drones, tablets, or wearable devices.

When started, the IoT sensor application 192 may connect to one of the edge systems via the network 130. After connection, the IoT sensor application 192 may search for a data source identifier associated with the type of input component (e.g., camera, microphone, GPS, motion sensor, etc.) of the I/O components 194 and a corresponding application(s) and/or data pipeline(s) of the applications and/or data pipelines 161(1)-(3) to which the data source is connected. The IoT sensor application 192 may submit an API call to the connected edge system to perform the search. In examples where more than one relevant edge system, more than one relevant data source, more than one relevant application and/or data pipeline, etc. are available, the IoT sensor application 192 may prompt a user to select each component. In other examples, the IoT sensor application 192 may automatically select one or more of the items. For example, the IoT sensor application 192 may dynamically detect a compatible data pipeline or application based on the type (e.g., category) of selected input component of the I/O components 194 and securely connect to it. This may allow for greater flexibility and scalability of a system, as new data pipelines and applications may be dynamically detected and provided data from input components of the I/O components 194 described herein. Similarly, the IoT sensor application 192 may dynamically detect an output of post processing by the data pipeline or application and securely consume data from it. This may allow for greater flexibility and scalability of a system, the IoT sensor application 192 described herein may consume data from new or changed post processing outputs, allowing for existing data pipelines and applications and analysis to take advantage of new post processing streams.

The IoT sensor application 192 may be configured to determine whether a selected data source is currently in use by another user or is free to use, and may alert a user if it is in use. In some examples, the IoT sensor application 192 may be configured to alert the user if a selected data source is not connected to an application or data pipeline. In some examples, the IoT sensor application 192 may be configured to alert the user if a selected application or data pipeline is not currently running. In some examples, the IoT sensor application 192 may be prompt the connected edge system to start a selected application or data pipeline if the IoT sensor application 192 detects that the selected application or data pipeline is not currently running.

When the data source is an input data source, the IoT sensor application 192 may be configured to capture data via the input component of the I/O components 194 and upload the captured data to the input data source using the identified edge system and the detected application or data pipeline. For example, the IoT sensor application 192 may be configured to upload a stream of video data from a camera of the I/O components 194 to input data source connected to the application or data pipeline for storage and/or for further processing of the data. In some examples, in addition to uploading captured realtime data, the IoT sensor application 192 may also be configured to upload previously captured data (e.g., a stored video or photo) to the input data source for storage and/or further processing.

In some examples, output data sources may provide a mechanism for the data output from the applications and/or data pipelines to be uploaded to a cloud computing system for further processing and/or storage. In some examples, the IoT sensor application 192 may be configured to connect to an output data source associated with an application and/or a data pipeline to receive and/or download processed data, and to present the received and/or downloaded data to a user via an output component (e.g., a display or screen, speaker, other transmitter, or combinations thereof) of the I/O components 194. For example, the output data source of the application or data pipeline may provide a live stream playback of the processed data. The processed data may be received using HTTP protocol using uniform resource locators (URLs).

In some examples, the IoT sensor application 192 may be configured to contemporaneously connect to both an input data source and an output data source to provide data captured via the input component of the I/O components 194 to a connected application or data pipeline and to receive processed data from the connected application or data pipeline for presentation via an output component of the I/O components 194. In some examples, the IoT sensor application 192 may be configured to connected to more than one input data source, more than one output data source, or any combination thereof.

In some examples, the communication between the edge system and the IoT sensor application 192 hosted on the mobile device 190 may include security protocols, such as URLs with expiry controls. The IoT sensor application 192 may also be able to identify a final storage location of the captured data after processing by the connected application or data pipeline in order to download the processed data for consumption or playback at a later time. The IoT sensor application 192 may also save the captured data to a shared library for consumption by other mobile or other computing devices. At least one benefit of the IoT sensor application 192 is to provide an interface that is able to automatically query all available applications or data pipelines of a particular category, rather than having to manually discover available applications or data pipelines. While FIG. 1 depicts a single mobile device 190, it is appreciated that the IoT system 100 may include multiple mobile devices without departing from the scope of the disclosure.

The centralized IoT manager 142 may be configured to generate or update and distribute data pipelines and applications to selected edge systems based on the configuration maintained for each edge system. For example, in response to a request for a new data pipeline or application associated with a particular type or category of data sources, the centralized IoT manager 142 may identify data sources having the particular type or category, and identify respective edge systems are connected to the identified data sources of the particular type or category. For each identified edge system, the centralized IoT manager 142 may generate a respective version of the application or data pipeline based on respective hardware configuration information for the edge system. That is, the centralized IoT manager 142 may independently generate the applications and data pipelines to efficiently operate according to the specific hardware configuration of each edge system. The data pipelines may be constructed using a group of containers (e.g., a pod) each configured to perform various functions within the data pipeline (e.g., subscriber, data processor, publisher, connectors that transform data for consumption by another container within the application or pod, etc.). In some examples, the centralized IoT manager 142 may be configured to define stages of a constructed data pipeline application using a user interface or representational state transfer (REST) API, with data ingestion and movement handled by the connector components built into the data pipeline.

The edge systems may provide the edge data to one or more respective data planes, such as the data plane 152 of the data computing system 150, via the network 130. In some examples, the edge stacks may be configured to implement respective data plane communication interfaces, including application programming interfaces (APIs), to communicate with the one or more data planes. The data plane 152 may be configured to store the edge data, process the edge data, aggregate the edge data across the IoT system 100, provide access to the edge data to clients, or any combination thereof. The edge data received and processed at the data plane 152 may provide insight into events, trends, health, etc., of the IoT system 100 based in data captured by the data sources.

Figure 2:
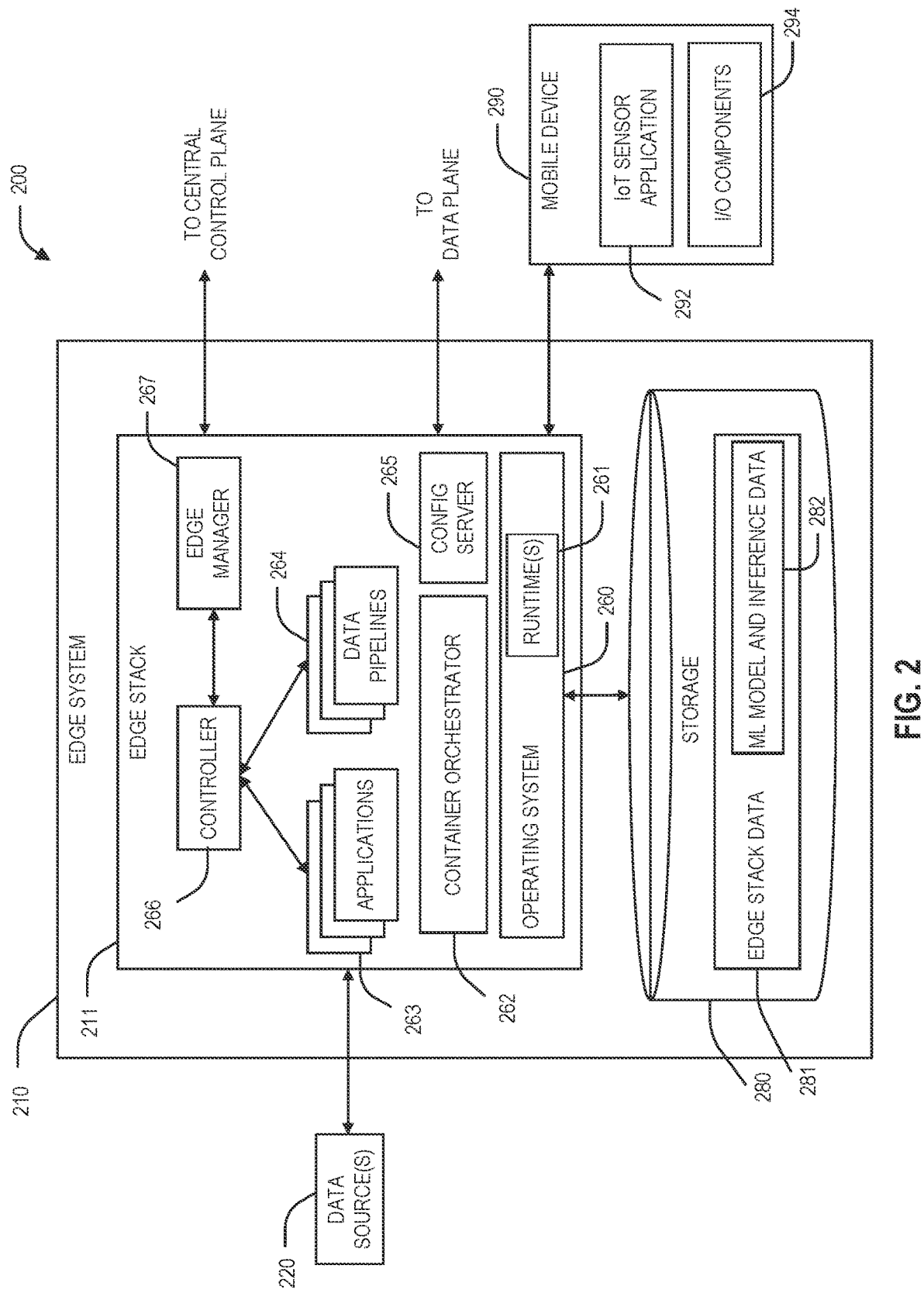
FIG. 2 is a block diagram of an edge computing system connected to a mobile device 290 of an IoT system, in accordance with an embodiment of the present disclosure.

FIG. 2 is a block diagram of an edge computing system 200 connected to a mobile device 290 of an IoT system, in accordance with an embodiment of the present disclosure. The edge computing system 200 may include an edge device/cluster/VM (edge system) 210 configured to host an edge stack 211 and storage 280. Any of the edge cluster(s) 110, the edge device(s) 112, and/or the edge VM(s) 115 of FIG. 1 may implement a respective version of the edge system 210. Any of the edge stack 111, the edge stack 113, and/or the edge stack 116 of FIG. 1 may implement some or all of the edge stack 211.

In some examples, the edge system 210 may include a respective cluster of computing nodes or devices that are configured to host a respective edge stack 211, with the edge stack 211 distributed across multiple computing nodes, devices, or VMs of the edge system 210. In some examples, the edge system 210 may be a single computing device configured to host the edge stack 211. In some examples, the edge system 210 may include a VM hosted on a server (e.g., or other host machine) that is configured to host the edge stack 211.

The storage 280 may be configured to store edge stack data 281, such as software images, binaries and libraries, metadata, etc., to be used by the edge system 210 to load and execute the edge stack. In some examples, the edge stack data 281 includes instructions that when executed by a process or the edge system 210, causes the edge system to perform functions described herein. The storage may include local storage (solid state drives (SSDs), hard disk drives (HDDs), flash or other non-volatile memory, volatile memory, or any combination thereof), cloud storage, networked storage, or any combination thereof.

The edge stack 211 includes a package hosted on a physical layer of the edge system 210 to facilitate communication with one or more data source(s) 220, other edge systems, a centralized IoT manager (e.g., the centralized IoT manager 142 of FIG. 1) via a control plane, a data plane (e.g., the data plane 152 of FIG. 1) and/or a mobile device 290 having one or more I/O components 294 and configured to host a IoT sensor application 292. The data source(s) 220 may each include one or more devices configured to receive and/or generate respective source data. The data source(s) 220 may include sensors (e.g., electrical, temperature, matter flow, movement, position, biometric data, or any other type of sensor), cameras, transducers, any type of RF receiver, or any other type of device configured to receive and/or generate source data.

In some examples, the IoT sensor application 292 may configure one or more of the I/O components 294 of the mobile device 290 as a data source within the IoT system. For example, the IoT sensor application 292 may provide an interface between an input or output component of the I/O components 294 and one or more applications 263 or data pipelines 264 of the edge stack 211, similar to one or more of the data source(s) 220. To configure the mobile device 290 as an input data source, the IoT sensor application 292 may use one or more input components (e.g., a camera, a microphone, GPS, motion sensor, etc.) of the I/O components 294 of the mobile device 290 as a data source to provide data to a connected application 263 or data pipeline 264.

To configure the mobile device 290 as an output data source (e.g., to receive processed data from an application 263 or data pipeline 264), the IoT sensor application 292 may use one or more output components (e.g., a display or screen, speaker, other type of transmitter, or combinations thereof) of the I/O components 294 of the mobile device 290 as an output data source to receive processed data from a connected application 263 or data pipeline 264. In some examples, the IoT sensor application 292 may configure the mobile device 290 as both an input data source and an output data source of one or more connected applications 263 or data pipelines 264. The IoT sensor application 292 may request available edge systems from the control plane, in some examples.

The edge stack 211 may host an underlying operating system 260 configured to interface the physical layer of the edge system 210. In some examples, a controller 266, an edge manager 267, a container orchestrator 262, and a configuration server 265 may run on the operating system 260. In some examples, the edge stack 211 may include a bare metal implementation that runs the operating system 260 directly on the physical layer. In other examples, the edge stack 211 may include a virtualized implementation with a hypervisor running on the physical layer and the operating system 260 running on the hypervisor.

The container orchestrator 262 may be configured to manage a containerized architecture of one or more applications 263 and/or one or more data pipelines 264. In some examples, the container orchestrator 262 may include Kubernetes® container orchestration software.

The edge manager 267 may communicate with the centralized IoT manager via the control plane to receive network configuration and communication information, data plane information, software packages for installation (e.g., including the applications 263 and the data pipelines 264), data source connectivity information, etc. In some examples, the edge manager 267 may also be configured to provide configuration and status information to the centralized IoT manager, including status information associated with one or more of the data source(s) 220.

In response to information received from the centralized IoT manager, the edge manager 267 may be configured to provide instructions to the controller 266 to manage the applications 263 and/or the data pipelines 264, which may include causing installation or upgrading of one of the applications 263 and/or the data pipelines 264; removing one of the applications 263 and/or the data pipelines 264; starting or stopping new instances of the applications 263 and/or the data pipelines 264; allocating hardware resources to each of the applications 263 and/or the data pipelines 264; or any combination thereof. The edge stack data 281 may include application and data pipeline data that includes data specific to the respective applications 263 and/or the data pipelines 264.

As previously described, the applications 263 and the data pipelines 264 may be implemented using a containerized architecture to receive source data from one or more of the data source(s) 220 (e.g., or from others of the applications 263 and/or the data pipelines 264) and to provide respective transformed data at an output by applying a respective function or algorithm to the received source data. In some examples, any user-specified or defined function or algorithm. In some examples, the applications 263 and the data pipelines 264 may be constructed from other computing primitives and building blocks, such as VMs, processes, etc., or any combination of containers, VMs, processes, etc. The applications 263 and data pipelines 264 may each be formed in a respective "sandbox" and may include a group of containers that communicate with each other via a virtual intra-"sandbox" network (e.g., a pod).

In some examples, the data pipelines 264 may be constructed using a group of containers (e.g., a pod) that each perform various functions within the data pipeline 264 (e.g., subscriber, data processor, publisher, connectors that transform data for consumption by another container within the application or pod, etc.) In some examples, the definition of stages of a constructed data pipeline 264 application may be described using a user interface or REST API, with data ingestion and movement handled by connector components built into the data pipeline. Thus, data may be passed between containers of a data pipeline 264 using API calls.

In some examples, the applications 263 and/or the data pipelines 264 may cause the edge data to be provided to a respective destination data plane (e.g., such as the data plane 152 of FIG. 1) or to another edge device via the edge manager 267.

In some examples, the configuration server 265 may be configured to bootstrap the edge stack 211 for connection to a central control plane (e.g., to communicate with the centralized IoT manager) during initial deployment of the edge system 210.

In operation, the edge stack 211 hosted on the edge system 210 may control operation of the edge system 210 with an IT system to facilitate communication with one or more data source(s) 220 and/or a data plane based on instructions provided from a centralized IoT manager via a control plane. The edge manager 267 of the edge stack 211 may communicate with the centralized IoT manager via the control plane to send configuration and/or status information (e.g., of the edge system 210 and/or one or more of the data source(s) 220) and/or to receive network configuration and communication information, data plane information, software packages for installation (e.g., including the applications 263 and the data pipelines 264), data source connectivity information, etc. In response to information received from the centralized IoT manager, the edge manager 267 may be configured to provide instructions to the controller 266 to manage the applications 263, the data pipelines 264, and/or the 270, which may include causing installation or upgrading of one of the applications 263 or the data pipelines 264; removing one of the applications 263 or the data pipelines 264; starting or stopping new instances of the applications 263 or the data pipelines 264, allocating hardware resources to each of the applications 263 and/or the data pipelines 264, storing data in and/or retrieving data from the edge stack data 281, or any combination thereof.

The applications 263 and the data pipelines 264 may receive source data from one or more of the data source(s) 220 (e.g., or from others of the applications 263 and/or the data pipelines 264) and to provide respective transformed data at an output by applying a respective function or algorithm to the received source data. In some examples, the respective algorithms or functions may include machine learning (ML) or artificial intelligence (AI) algorithms. In some examples, the applications 263 and/or the data pipelines 264 may cause the received and/or processed source data to be provided to a respective destination data plane (e.g., such as the data plane 152 of FIG. 1) via the configuration server 265. In some examples, the applications 263 and/or the data pipelines 264 may be implemented using a containerized architecture deployed and managed by the container orchestrator 262. Thus, the container orchestrator 262 may deploy, start, stop, and manage communication with the applications 263 and/or the data pipelines 264 within the edge stack 211.

In some examples, the edge system 210 may be connected to one or more of the mobile device 290 capable as serving as a data source for one or more the applications 263 and/or the data pipelines 264. The IoT sensor application 292 hosted on the mobile device 290 may be configured to cause the mobile device 290 to be added as a data source for the one or more applications 263 and/or the data pipelines 264. The mobile device 290 may communicate with the edge system 210 via a network (e.g., the network 130 of FIG. 1), in some examples. The IoT sensor application 292 may be configured to provide an interface between an input component (e.g., a camera, a microphone, GPS, motion sensor, etc.) of the I/O components 294 of the mobile device 290 and a data pipeline 264 or application 263 and/or to a data plane as an input data source. In some examples, the IoT sensor application 292 may also configure the mobile device 290 as an output data source (e.g., a consumer of processed data) to receive processed data after from one or more of the applications 263 and/or data pipelines 264.

When started, the IoT sensor application 292 may connect to the edge system 210. After connection, the IoT sensor application 292 may search for a data source identifier associated with the type of input component (e.g., camera, microphone, GPS, motion sensor, etc.) of the I/O components 294 and a corresponding application(s) 263 and/or data pipeline(s) 264 to which the data source is connected. The IoT sensor application 292 may submit an API call to the edge system 210 to perform the search. In examples where more than one relevant data source and/or more than one relevant application 263 and/or data pipeline 264 are available, the IoT sensor application 292 may prompt a user to select each item. In other examples, the IoT sensor application 292 may automatically select one or more of the components based on a selection criteria (e.g., availability, previous selections, common selections, etc.). For example, the IoT sensor application 292 may dynamically detect a compatible data pipeline or application based on the type (e.g., category) of selected input component of the I/O components 294 and securely connect to it. This may allow for greater flexibility and scalability of a system, as new data pipelines and applications may be dynamically detected and provided data from input components of the I/O components 294 described herein. Similarly, the IoT sensor application 292 may dynamically detect an output of post processing by the data pipeline or application and securely consume data from it. This may allow for greater flexibility and scalability of a system, the IoT sensor application 292 described herein may consume data from new or changed post processing outputs, allowing for existing data pipelines and applications and analysis to take advantage of new post processing streams.

The IoT sensor application 292 may be configured to determine whether a selected data source is currently in use by another user or is free to use, and may alert a user if it is in use. In some examples, the IoT sensor application 292 may be configured to alert the user if a selected data source is not connected to one of the applications 263 or to the data pipeline 264. In some examples, the IoT sensor application 292 may be configured to alert the user if a selected application or data pipeline is not currently running. In some examples, the IoT sensor application 292 may be prompt the connected edge system to start a selected application or data pipeline if the IoT sensor application 292 detects that the selected application or data pipeline is not currently running.

When the data source is an input data source, the IoT sensor application 292 may be configured to capture data via the input component of the I/O components 294 and upload the captured data to the input data source using the edge system 210 and the application 263 or the data pipeline 264. For example, the IoT sensor application 292 may be configured to upload a stream of video data from a camera of the I/O components 294 to input data source connected to the application 263 or the data pipeline 264 for storage and/or for further processing of the data. In some examples, in addition to uploading captured realtime data, the IoT sensor application 292 may also be configured to upload previously captured data (e.g., a stored video or photo) to the input data source for storage and/or further processing.

In some examples, output data sources may provide a mechanism for the data output from the applications 263 and/or data pipelines to be uploaded to a cloud computing system for further processing and/or storage. In some examples, the IoT sensor application 292 may be configured to connect to an output data source associated with an application 263 and/or a data pipeline 264 to receive and/or download processed data, and to present the received and/or downloaded data to a user via an output component (e.g., a display or screen, speaker, other transmitter, or combinations thereof) of the I/O components 294. For example, the output data source of the application or data pipeline may provide a live stream playback of the processed data. The processed data may be received using HTTP protocol using uniform resource locators (URLs).

In some examples, the IoT sensor application 292 may be configured to contemporaneously connect to both an input data source and an output data source to provide data captured via the input component of the I/O components 194 to a connected application or data pipeline and to receive processed data from the connected application or data pipeline for presentation via an output component of the I/O components 294. In some examples, the IoT sensor application 292 may be configured to connected to more than one input data source, more than one output data source, or any combination thereof.

In some examples, the communication between the edge system and the IoT sensor application 292 hosted on the mobile device 290 may include security protocols, such as URLs with expiry controls. The IoT sensor application 292 may also be able to identify a final storage location of the captured data after processing by the connected application or data pipeline in order to download the processed data for consumption or playback at a later time. The IoT sensor application 292 may also save the captured data to a shared library for consumption by other mobile or other computing devices. At least one benefit of the IoT sensor application 292 is to provide an interface that is able to automatically query all available applications or data pipelines of a particular category, rather than having to manually discover available applications or data pipelines. While FIG. 2 depicts a single mobile device 290, it is appreciated that the edge system 210 may connect to multiple mobile devices having the IoT sensor application without departing from the scope of the disclosure.

The edge stack 211 may interface with one or more respective data planes (e.g., or other edge systems) to send data from and receive data at the edge system 210 using respective data plane communication interfaces, including APIs. Thus, the edge stack 211 may route transformed data from the applications 263 and/or the data pipelines 264 to a data plane (e.g., or another edge system) as edge data.

Figure 3A:
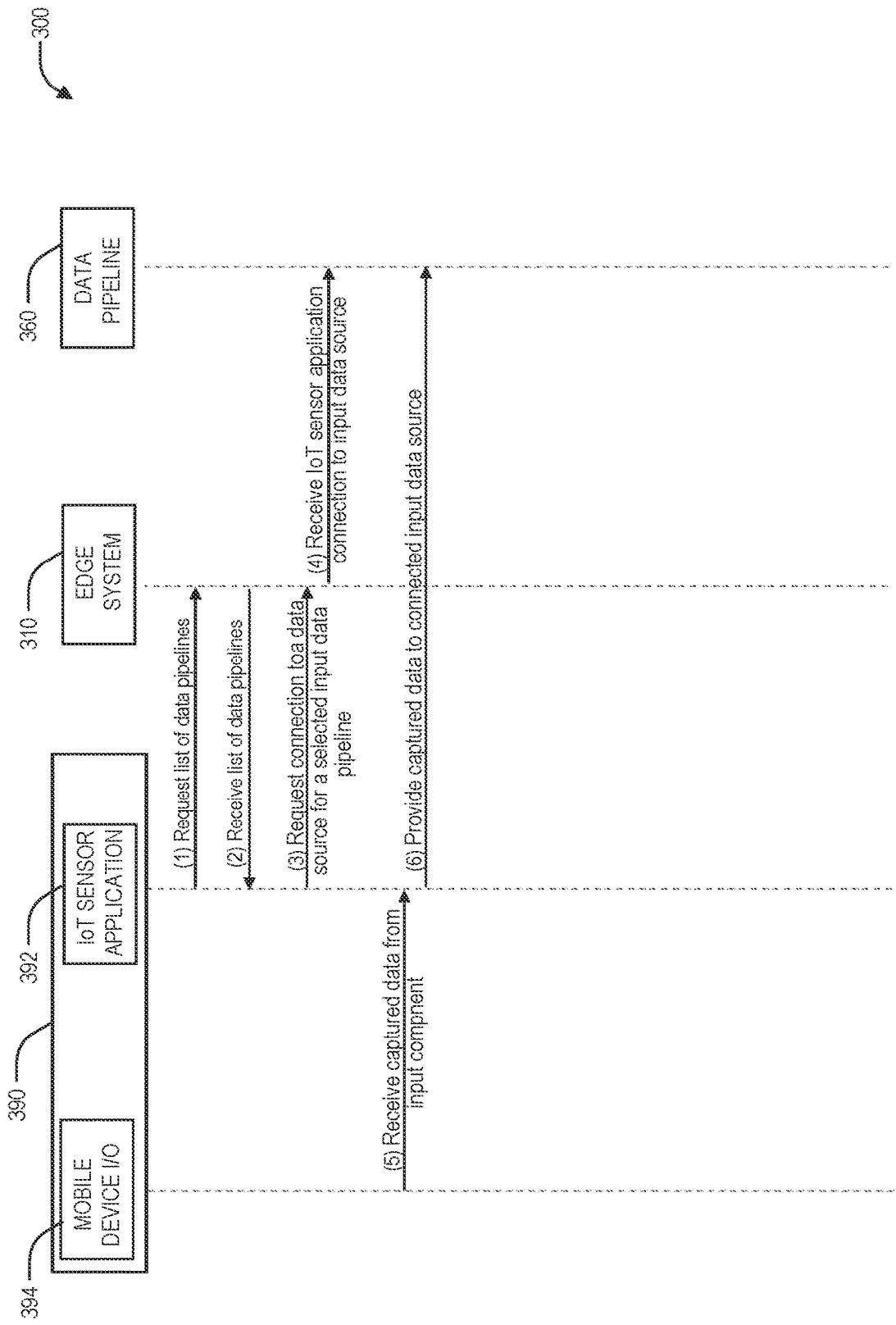
FIG. 3A is a sequence diagrams of a handshake method between a mobile device and an edge system for connection to an input data source in accordance with an embodiment of the present disclosure.

FIG. 3A is a sequence diagrams of a handshake method 300 between a mobile device 390 and an edge system 310 for connection to an input data source in accordance with an embodiment of the present disclosure. The mobile device 390 may include one or more I/O) components 394, and may be configured to host an IoT sensor application 392. The edge system 310 may be configured to host a data pipeline or application 360, which may include a data pipeline or an application. Communication between the mobile device 390 and the edge system 310 and/or the data pipeline or application 360 may take place of a network, such as the network 130 of FIG. 1. The mobile device 190 of FIG. 1 and/or the mobile device 290 of FIG. 2 may implement the mobile device 390, in some examples. The edge cluster(s) 110, the edge device(s) 112, and/or the edge VM(s) 115 hosted on the server/cluster 114 of FIG. 1 and/or the edge system 210 of FIG. 2 may implement the edge system 310, in some examples. The communications between the mobile device 390 and the edge system 310 (or the data pipeline or application 360) may be via API calls via an exposed API. In some examples, the IoT sensor application 392 may request a list of edge systems (e.g., edge system identifiers) of an associated IoT system from a centralized IoT manager (e.g., the centralized IoT manager 142 of FIG. 1), and may select the edge system 310 from the list of edge systems for connection as a data source. In some examples, the IoT sensor application 392 may perform a login operation to log into the IoT system using assigned credentials associated with the mobile device 390 prior to requesting the list of edge systems. In some examples, the login operation may include scanning or reading a quick response (QR) code via a portal (e.g., connection to the centralized IoT manager 142 of FIG. 1) of the IoT system to retrieve a token, and then using that token to log into the edge system 310.

The handshake method 300 may include (1) the IoT sensor application 392 providing a request for a list of data pipelines and/or applications to the edge system 310. The list of data pipelines and/or applications may include data pipelines and/or applications hosted by the edge system 310, in some examples. The request may include category identifier indicating a category or type of data pipeline or application, in some examples. The category identifier may indicate a type of input component (e.g., camera, microphone, position sensor, temperature sensor, motion sensor, etc., or any combination thereof) of the I/O) components 394 for capturing data, in some examples. Additionally or alternatively, the category identifier may include a type of data to be provided from the IoT sensor application 392, such as video, audio, images, temperature data, location data, motion data, etc. or any combination thereof. Additionally or alternatively, the category identifier may include a type of data processing or analysis performed by the data pipeline and/or application, such as video processing or analysis, audio processing or analysis, image processing or analysis, temperature monitoring, location tracking, motion tracking, etc., or any combination thereof. In some examples, the request may include multiple category identifiers to indicate a type of input component, a type of data, a type of data processing or analysis, etc. The category identifier(s) may be selected by a user in response to a display prompt presented to the user.

The handshake method 300 may further include (2) the edge system 310 providing the list of data pipelines and/or applications to the IoT sensor application 392 in response to the received request. The list may include all data pipelines and/or applications, in some examples. In other examples, the list of data pipelines and/or applications may include only data pipelines and/or applications associated with the category identifier(s). In some examples, the list of data pipelines and/or applications may include a respective indication as to whether each of the data pipelines and/or applications are currently running on the edge system 310. In response to a determination that a particular data pipeline or application is not running, the IoT sensor application 392 may provide a request to the edge system 310 to start the particular data pipeline or application.

In some examples, the IoT sensor application 392 may present the list of data pipelines and/or applications to a user, and prompt the user to select one or more of the IoT sensor application 392 for connection. In other examples, the IoT sensor application 392 may automatically select a data pipeline or application from the list of data pipelines and/or applications based on predetermined criteria (e.g., availability, popularity, previous user selection, etc.). In some examples, the list of data pipelines and applications may include a field indicating whether the input data source associated with the selected data pipeline or application 360 is free. In some examples, the IoT sensor application 392 may request availability of the input data source associated with the selected data pipeline or application 360 prior to requesting connection to the input data source. In response to the request for availability, the edge system 310 and/or the data pipeline or application 360 may response with an availability message.

The handshake method 300 may further include (3) the IoT sensor application 392 providing a request for connection to an input data source associated with the selected data pipeline or application 360 from the list of data pipelines and/or applications to the edge system 310. The request may include an output data source identifier associated with the selected data pipeline or application 360, an identifier associated with the mobile device 390, or a combination thereof. In some examples, the input data source identifier associated with the data pipeline or application 360 may be included in a field of an entry of the list of data pipelines and applications associated with the selected data pipeline or application 360. In other examples, a function (e.g., an API call, such as an API put call) to fetch the input data source identifier may be included in a field of an entry of the list of data pipelines and applications associated with the selected data pipeline or application 360, and the IoT sensor application 392 may provide a request for an input data source identifier associated with the data pipeline or application 360 to the edge system 310 and/or the data pipeline or application 360 based on the function, and the edge system 310 and/or the data pipeline or application 360 may respond with the input data source identifier. In some examples, the IoT sensor application 392 may request availability of the input data source prior to requesting connection to the input data source. In response to the request for availability, the edge system 310 and/or the data pipeline or application 360 may response with an availability response. The request for connection to the input data source may include an identifier associated with the mobile device 390, in some examples.

The handshake method 300 may include (4) the edge system 310 providing the request for connection to the input data source associated with a selected data pipeline or application 360 to the data pipeline or application 360. The data pipeline or application 360 may assign the mobile device 390 to the input data source in response to receipt of the request. The handshake method 300 further includes (5) the IoT sensor application 392 receiving captured data from an input component of the I/O components 394. The handshake method 300 may further includes (6) the IoT sensor application 392 may provide the captured data received from the input component to the data pipeline or application 360. The data pipeline or application 360 may be configured to process or transform the data according to programmed transfer instructions. The processed or transformed data may be passed to the output data source, in some examples.

Figure 3B:
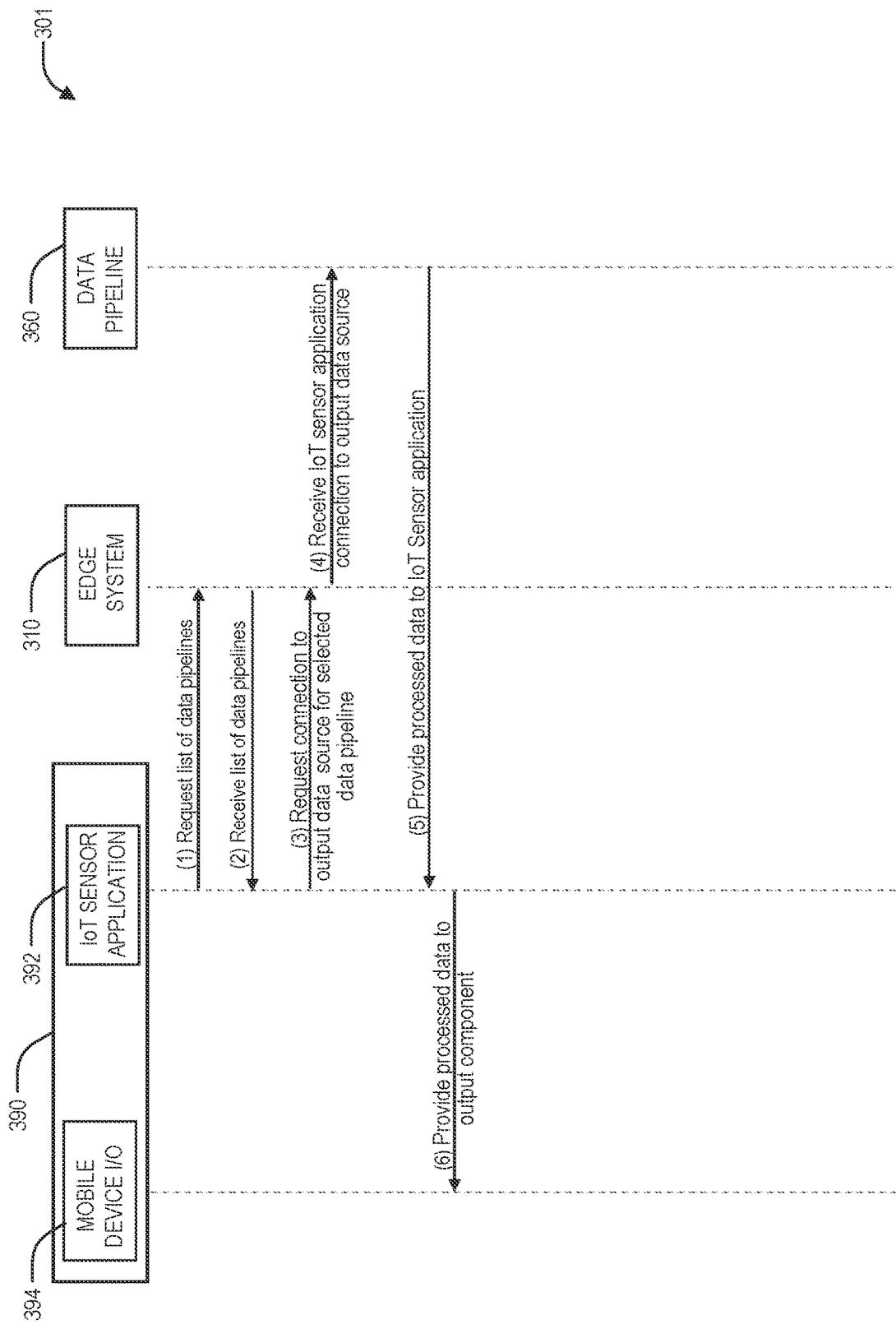
FIG. 3B is a sequence diagram of a handshake method between a mobile device and an edge system for connection to an output data source in accordance with an embodiment of the present disclosure.

FIG. 3B is a sequence diagram of a handshake method 301 between a mobile device 390 and an edge system 310 for connection to an output data source in accordance with an embodiment of the present disclosure. The mobile device 390 may include one or more I/O components 394, and may be configured to host an IoT sensor application 392. The edge system 310 may be configured to host a data pipeline or application 360, which may include a data pipeline or an application. Communication between the mobile device 390 and the edge system 310 and/or the data pipeline or application 360 may take place of a network, such as the network 130 of FIG. 1. The mobile device 190 of FIG. 1 and/or the mobile device 290 of FIG. 2 may implement the mobile device 390, in some examples. The edge cluster(s) 110, the edge device(s) 112, and/or the edge VM(s) 115 hosted on the server/cluster 114 of FIG. 1 and/or the edge system 210 of FIG. 2 may implement the edge system 310, in some examples. The communications between the mobile device 390 and the edge system 310 (or the data pipeline or application 360) may be via API calls via an exposed API. In some examples, the IoT sensor application 392 may request a list of edge systems (e.g., edge system identifiers) of an associated IoT system from a centralized IT manager (e.g., the centralized IoT manager 142 of FIG. 1), and may select the edge system 310 from the list of edge systems for connection as a data source. In some examples, the IoT sensor application 392 may perform a login operation to log into the IoT system using assigned credentials associated with the mobile device 390 prior to requesting the list of edge systems. In some examples, the login operation may include scanning or reading a quick response (QR) code via a portal (e.g., connection to the centralized IoT manager 142 of FIG. 1) of the IoT system to retrieve a token, and then using that token to log into the edge system 310.

The handshake method 301 may include (1) the IoT sensor application 392 providing a request for a list of data pipelines and/or applications to the edge system 310. The list of data pipelines and/or applications may include data pipelines and/or applications hosted by the edge system 310, in some examples. The request may include category identifier indicating a category or type of data pipeline or application, in some examples. The category identifier may indicate a type of input component (e.g., camera, microphone, position sensor, temperature sensor, motion sensor, etc., or any combination thereof) of the I/O components 394 for capturing data, in some examples. Additionally or alternatively, the category identifier may include a type of data to be provided from the IoT sensor application 392, such as video, audio, images, temperature data, location data, motion data, etc. or any combination thereof. Additionally or alternatively, the category identifier may include a type of data processing or analysis performed by the data pipeline and/or application, such as video processing or analysis, audio processing or analysis, image processing or analysis, temperature monitoring, location tracking, motion tracking, etc., or any combination thereof. In some examples, the request may include multiple category identifiers to indicate a type of input component, a type of data, a type of data processing or analysis, etc. The category identifier(s) may be selected by a user in response to a display prompt presented to the user.

The handshake method 301 may further include (2) the edge system 310 providing the list of data pipelines and/or applications to the IoT sensor application 392 in response to the received request. The list may include all data pipelines and/or applications, in some examples. In other examples, the list of data pipelines and/or applications may include only data pipelines and/or applications associated with the category identifier(s). In some examples, the list of data pipelines and/or applications may include a respective indication as to whether each of the data pipelines and/or applications are currently running on the edge system 310. In response to a determination that a particular data pipeline or application is not running, the IoT sensor application 392 may provide a request to the edge system 310 to start the particular data pipeline or application.

In some examples, the IoT sensor application 392 may present the list of data pipelines and/or applications to a user, and prompt the user to select one or more of the IoT sensor application 392 for connection. In other examples, the IoT sensor application 392 may automatically select a data pipeline or application from the list of data pipelines and/or applications based on predetermined criteria (e.g., availability, popularity, previous user selection, etc.). In some examples, the list of data pipelines and applications may include a field indicating whether the output data source associated with the selected data pipeline or application 360 is free. In some examples, the IoT sensor application 392 may request availability of the output data source associated with the selected data pipeline or application 360 prior to requesting connection to the output data source. In response to the request for availability, the edge system 310 and/or the data pipeline or application 360 may response with an availability message.

The handshake method 301 may further include (3) the IoT sensor application 392 providing a request for connection to an output data source associated with the selected data pipeline or application 360 from the list of data pipelines and/or applications to the edge system 310. The request may include an output data source identifier associated with the selected data pipeline or application 360, an identifier associated with the mobile device 390, or a combination thereof. In some examples, the output data source identifier associated with the data pipeline or application 360 may be included in a field of an entry of the list of data pipelines and applications associated with the selected data pipeline or application 360. In other examples, a function (e.g., an API call) to fetch the output data source identifier may be included in a field of an entry of the list of data pipelines and applications associated with the selected data pipeline or application 360, and the IoT sensor application 392 may provide a request for an output data source identifier associated with the data pipeline or application 360 to the edge system 310 and/or the data pipeline or application 360 based on the function, and the edge system 310 and/or the data pipeline or application 360 may respond with the output data source identifier.

The handshake method 301 may include (4) the edge system 310 providing the request for connection to the output data source associated with the data pipeline or application 360 to the data pipeline or application 360. The data pipeline or application 360 may assign the mobile device 390 (e.g., using the identifier associated with the mobile device 390) to the output data source in response to receipt of the request. The handshake method 301 further includes (5) the data pipeline or application 360 providing processed or transformed data to the IoT sensor application 392. The handshake method 301 may further includes (6) the IoT sensor application 392 may provide the processed data received from the data pipeline or application 360 to an output component of the I/O components 394. The output component may be configured to present the processed data to a user.

In some examples, steps of the handshake method 300 and the handshake method 301 of FIGS. 3A and 3B, respectively, may be combined. For example, steps (1) and (2) of the handshake method 300 and the handshake method 301 are the same steps. As such, when connecting to both the input data source (e.g., via the handshake method 300) and the output data source (e.g., via the handshake method 301) of the data pipeline or application 360, the steps (1) and (2) may only be performed one time. In addition, the handshake method 300 and the handshake method 301 may cause a field of the input data source or the output data source to be updated with a unique identifier associated with the mobile device 390 upon an initial connection such that subsequent connections are automated. In some examples, the input data source and/or the output data source may be configured with more than one channel such that they are able to connect to more than one of the mobile device 390 at the same time. In addition, the IoT sensor application 392 may support connection to more than one input data source or output data source using the same or different input or output components of the I/O components 394 at the same time.

In some examples, rather than requesting a list of data pipelines as described with reference to step (1) of the handshake method 300 and the handshake method 301, the IoT sensor application 392 may request a list of input data sources of a particular category for the handshake method 300 or a list of output data sources of a particular category for the handshake method 301, and may use that information to discover associated or connected data pipelines or applications. If no data pipelines or applications are connected to a particular input data source or a particular output data source, the IoT sensor application 392 may provide a request for connection to a data pipeline or application.

Figure 4:
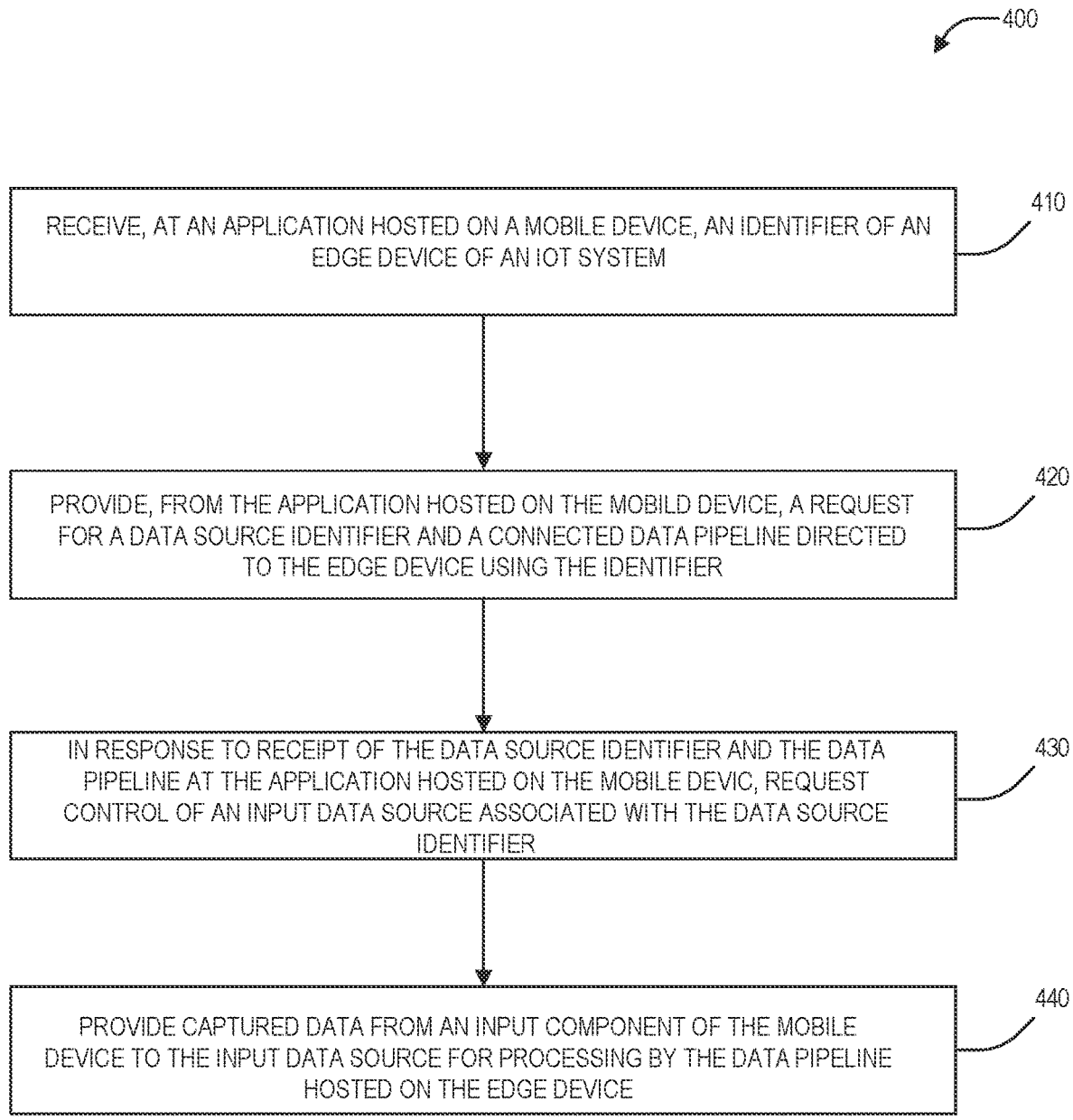
FIG. 4 is a flow diagram of a method to add a mobile device as a data source in an Internet of Things (IoT) system, in accordance with an embodiment of the present disclosure.

FIG. 4 is a flow diagram of a method 400 to add a mobile device as a data source in an Internet of Things (IoT) system, in accordance with an embodiment of the present disclosure. The method 600 may be performed by the IoT sensor application 192 hosted on the mobile device 190 of FIG. 1, the IoT sensor application 292 hosted on the mobile device 190 of FIG. 2, the IoT sensor application 392 hosted on the mobile device 390 of FIGS. 3A and/or 3B, or any combination thereof.

The method 400 may include receiving an identifier of an edge device of an Internet of Things (IoT) system at an application hosted on a mobile device, at 410. The IoT system may include the IoT system 100 of FIG. 1. The edge device may include the edge cluster(s) 110, the edge device(s) 112, and/or the edge VM(s) 115 hosted on the server/cluster 114 of FIG. 1, the edge system 210 of FIG. 2, and/or the edge system 310 of FIG. 3, in some examples. In some examples, the method 400 further includes receiving, at the application hosted on the mobile device, the data source identifier in a list of available data source identifiers of the selected data source category identified in the request for the data source identifier. In some examples, the method 400 further includes providing, from the application hosted on the mobile device, the request for the list of available data source identifiers associated with the selected data source category.

The method 400 may further include providing, from the application hosted on the mobile device, a request for an input data source identifier and a connected data pipeline directed to the edge device using the identifier, at 420. The request may include a selected data source category. In some examples, the method 400 further includes, in response to receipt of the input data source identifier, determining, at the application hosted on the mobile device, whether the input data source associated with the input data source identifier is available.

The method 400 may further include, in response to receipt of the input data source identifier and the data pipeline at the application hosted on the mobile device, requesting control of an input data source associated with the input data source identifier, at 430. The data pipeline may include any of the applications or data pipelines 161(1)-(3) of FIG. 1, the applications 263 and/or the data pipelines 264 of FIG. 2, the data pipeline or application 360 of FIG. 3A or 3B, or combinations thereof. In some examples, the method 400 further includes, in response to receipt of the input data source identifier, determining, at the application hosted on the mobile device, whether the input data source associated with the input data source identifier is available. In some examples, the method 400 further includes providing, from the application hosted on the mobile device, an identifier associated with the mobile device with the request to control the input data source. In some examples, the method may further include, in response to a determination that the data pipeline is not currently running at the edge device, providing, from the application hosted on the mobile device, a request to start the data pipeline The method 400 may further include providing captured data from an input component to the input data source for processing by the connected data pipeline hosted on the edge device, at 440. The input component may include an input component of the I/O components 194 of FIG. 1, the I/O components 294 of FIG. 2, the I/O components 394 of FIGS. 3A and/or 3B, or any combination thereof. In some examples, the method 400 may further include receiving, at the application hosted on the mobile device, the captured data via an input component, such as a camera, a microphone, a position sensor, or a motion sensor.

In some examples, the method 400 may further include receiving, at the application hosted on the mobile device, processed data derived from the captured data from an output data source connected to the connected data pipeline. In some examples, the method 400 may further include receiving, at the application hosted on the mobile device, processed data derived from the captured data from an output data source connected to the connected data pipeline using hypertext transfer protocol or hypertext transfer protocol uniform resource locators with expiry controls. In some examples, the method 400 may include presenting the processed data to a user via an output component of the mobile device, in some examples. The output component may include an output component of the I/O components 194 of FIG. 1, the I/O components 294 of FIG. 2, the I/O components 394 of FIGS. 3A and/or 3B, or any combination thereof.

The method 400 may be implemented as instructions stored on a computer readable medium (e.g., memory, disks, etc.) that are executable by one or more processor units to perform the method 400.

Figure 5:
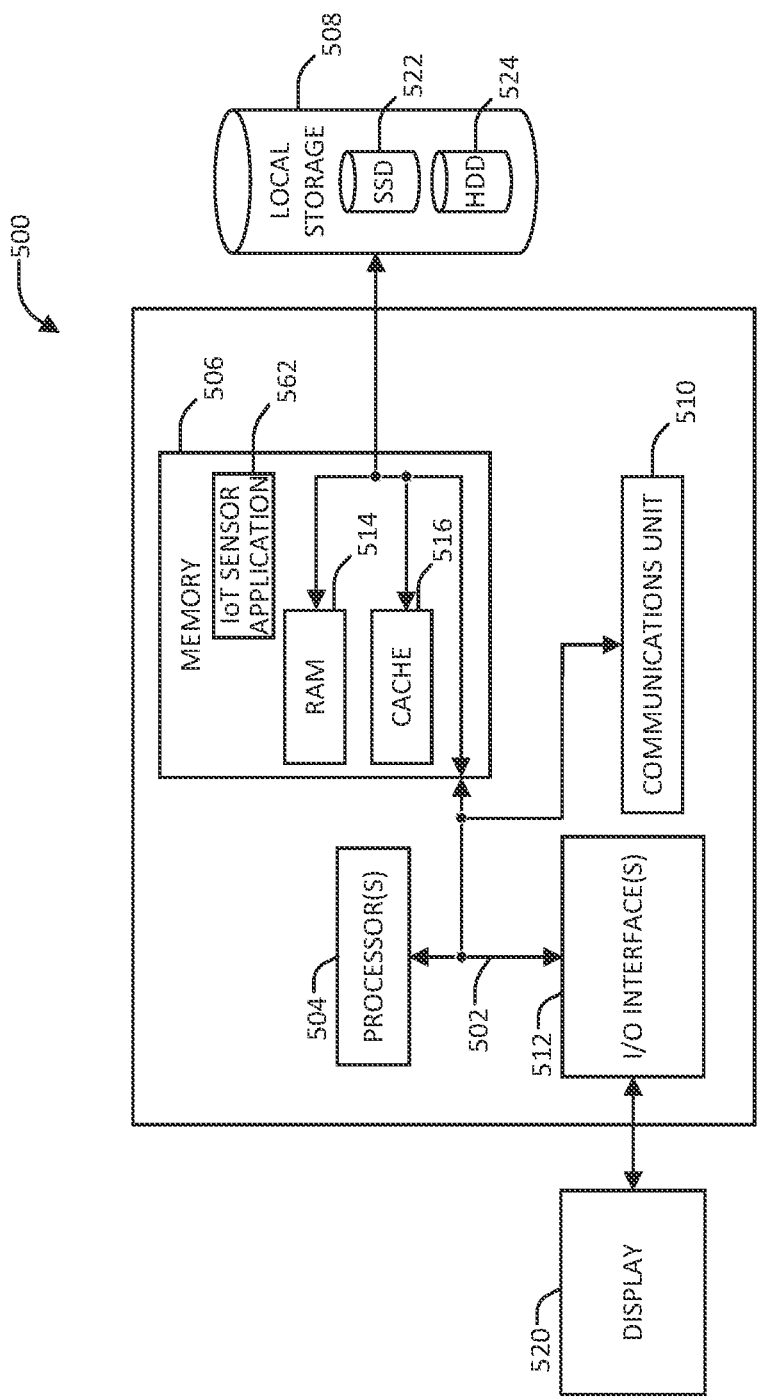
FIG. 5 is a block diagram of components of an edge system or computing in accordance with an embodiment of the present disclosure.

FIG. 5 depicts a block diagram of components of an edge system and/or a computing node (device) 500 in accordance with an embodiment of the present disclosure. It should be appreciated that FIG. 5 provides only an illustration of one implementation and does not imply any limitations with regard to the environments in which different embodiments may be implemented. Many modifications to the depicted environment may be made. The device 500 may implemented as any of an edge device of the edge cluster(s) 110, the edge device(s) 112, the server/cluster 114, a computing node of the central IoT computing system 140, a computing node of the data computing system 150, and/or the mobile device 190 of FIG. 1, all or part of the edge computing system 200 and/or the mobile device 290 of FIG. 2, the mobile device 390 or the edge system 310 of FIG. 3A or 3B. The device 500 may be configured to implement the method 400 of FIG. 4 to add a mobile device as a data source in an Internet of Things (IoT) system.

The device 500 includes a communications fabric 502, which provides communications between one or more processor(s) 504, memory 506, local storage 508, communications unit 510, I/O interface(s) 512. The communications fabric 502 can be implemented with any architecture designed for passing data and/or control information between processors (such as microprocessors, communications and network processors, etc.), system memory, peripheral devices, and any other hardware components within a system. For example, the communications fabric 502 can be implemented with one or more buses.

The memory 506 and the local storage 508 are computer-readable storage media. In this embodiment, the memory 506 includes random access memory RAM 514 and cache 516. In general, the memory 506 can include any suitable volatile or non-volatile computer-readable storage media In this embodiment, the local storage 508 includes an SSD 522 and an HDD 524. The memory 506 may store the IoT sensor application 562 instructions. The IoT sensor application may include the IoT sensor application 192 of FIG. 1, the IoT sensor application 292 of FIG. 2, the IoT sensor application 292 of FIGS. 3A and/or 3B, or any combination thereof.

Various computer instructions, programs, files, images, etc. may be stored in local storage 508 for execution by one or more of the respective processor(s) 504 via one or more memories of memory 506. In some examples, local storage 508 includes a magnetic HDD 524. Alternatively, or in addition to a magnetic hard disk drive, local storage 508 can include the SSD 522, a semiconductor storage device, a read-only memory (ROM), an erasable programmable read-only memory (EPROM), a flash memory, or any other computer-readable storage media that is capable of storing program instructions or digital information.

The media used by local storage 508 may also be removable. For example, a removable hard drive may be used for local storage 508. Other examples include optical and magnetic disks, thumb drives, and smart cards that are inserted into a drive for transfer onto another computer-readable storage medium that is also part of local storage 508.

Communications unit 510, in these examples, provides for communications with other data processing systems or devices. In these examples, communications unit 510 includes one or more network interface cards. Communications unit 510 may provide communications through the use of either or both physical and wireless communications links.

I/O interface(s) 512 allows for input and output of data with other devices that may be connected to device 500. For example, I/O interface(s) 512 may provide a connection to external device(s) 518 such as a keyboard, a keypad, a touch screen, and/or some other suitable input device. External device(s) 518 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 508 via I/O interface(s) 512. I/O interface(s) 512 also connect to a display 520.

Display 520 provides a mechanism to display data to a user and may be, for example, a computer monitor.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. A non-transitory computer-readable media encoded with instructions which, when executed, cause a mobile device to:

perform, by a sensor application hosted by the mobile device, a login operation to log into a system configured to host one or more data pipelines and one or more applications managed by a centralized manager of the system, the login operation comprising scanning a quick response (QR) code via a portal to retrieve a token used to log into the system, the login operation based at least on access credentials assigned to the mobile device, the portal comprising a connection to the centralized manager of the system;

execute, by the sensor application, an application programming interface (API) login call to login to an edge device;

provide, by the sensor application, an API application request call, including a category identifier, to request a list of available applications of the one or more applications hosted by the system associated with the category identifier;

retrieve, by the sensor application, a function to fetch an input data source interface and an output data source interface from a field of the list of available applications for a selected application from the list of available applications;

provide, by the sensor application, an API put call including an identifier associated with the mobile device to connect to the input data source interface and to connect to the output data source interface; and provide, by the sensor application, captured data to the selected application via the input data source interface or receive playback data provided by the selected application via the output data source interface.

2. The non-transitory computer-readable media of claim 1, wherein the instructions further cause the mobile device to, prior to provision of the API put call, to connect to the input data source interface and determine whether the input data source is in use by another device.

3. The non-transitory computer-readable media of claim 1, wherein the instructions further cause the mobile device to provide the API application request call to request the list of available applications associated with a particular category.

4. The non-transitory computer-readable media of claim 3, wherein the particular category is indicative of input component, a type of data, a type of data processing or analysis, or combinations thereof.

5. The non-transitory computer-readable media of claim 1, wherein the instructions further cause the mobile device to provide the playback data to cloud storage.

6. The non-transitory computer-readable media of claim 1, wherein the instructions further cause the mobile device to receive processed data derived from the captured data from an output data source connected to the selected application using hypertext transfer protocol (HTTP).

7. The non-transitory computer-readable media of claim 1, wherein the login operation comprises scanning the QR code via the portal to retrieve the token.

8. The non-transitory computer-readable media of claim 7, the instructions further cause the mobile device to execute the API login call using the token to login to the edge device.

9. The non-transitory computer-readable media of claim 1, wherein the captured data is received at the mobile device via a camera, a microphone, a position sensor, a motion sensor, or combinations thereof.

10. A method, comprising:
performing, by a sensor application hosted on a mobile device, a login operation to log into a system configured to host one or more data pipelines and one or more applications managed by a centralized manager of the system, the login operation comprising reading a quick response (QR) code from a portal to retrieve a token used to log into the system, the login operation based at least on access credentials assigned to the mobile device, the portal comprising a connection to the centralized manager of the system;

executing, by the sensor application, an application programming interface (API) login call using the token to login to an edge device;

providing, by the sensor application, an API application request call, including a category identifier, to request a list of available applications of the one or more applications hosted by the system associated with the category identifier;

retrieving, by the sensor application, a function to fetch an input data source interface and an output data source interface from a field of the list of available applications for a selected application from the list of available applications;

providing, by the sensor application, an API put call including an identifier associated with the mobile device to connect to the input data source interface and to connect to the output data source interface; and start providing, by the sensor application, captured data to the selected application via the input data source interface or start receiving playback data provided by the selected application via the output data source interface.

11. The method of claim 10, further comprising connecting to the input data source interface and determining whether the input data source is used by another device, prior to the API put call.

12. The method of claim 10, further comprising providing the API application request call to request the list of available applications associated with a particular category.

13. The method of claim 12, wherein the particular category is indicative of input component, a type of data, a type of data processing or analysis, or combinations thereof.

14. The method of claim 10, further comprising providing the playback data to cloud storage.

15. The method of claim 10, further comprising receiving processed data derived from the captured data from an output data source connected to the selected application using hypertext transfer protocol (HTTP).

16. The method of claim 10, wherein the captured data is received at the mobile device via a camera, a microphone, a position sensor, a motion sensor, or combinations thereof.

17. A system comprising:
an edge device, a mobile device, and one or more data sources, wherein:
the mobile device is configured to:
log into, by a sensor application hosted on the mobile device, the system configured to host one or more data pipelines and one or more applications managed by a centralized manager of the system, the logging in based at least on access credentials assigned to the mobile device, the logging in comprising scanning a quick response (QR) code via a portal to retrieve a token used to log into the system, the portal comprising a connection to the centralized manager of the system;

execute, by the sensor application, an application programming interface (API) login call to log into the edge device;

provide, by the sensor application, an API application request call, including a category identifier, to request a list of available applications of the one or more applications hosted by the system associated with the category identifier;

retrieve, by the sensor application, a function to fetch an input data source interface and an output data source interface from a field of the list of available applications for a selected application from the list of available applications; and provide, by the sensor application, an API put call including an identifier associated with the mobile device to connect to the input data source interface and to connect to the output data source interface, wherein the input data source interface and the output data source interface are associated with the one or more data sources.

18. The system of claim 17, wherein the mobile device is configured to provide captured data to the selected application via the input data source interface or receive playback data provided by the selected application via the output data source interface.

19. The system of claim 18, wherein the mobile device is configured to provide the playback data to cloud storage.

20. The system of claim 18, wherein the mobile device is configured to receive processed data derived from the captured data from an output data source connected to the selected application using hypertext transfer protocol (HTTP).

21. The system of claim 18, wherein the captured data is received at the mobile device via a camera, a microphone, a position sensor, a motion sensor, or combinations thereof.

22. The system of claim 17, wherein the login operation performed by the mobile device comprises scanning the QR code via the portal to retrieve the token.

23. The system of claim 22, wherein the mobile device is configured to execute the API login call using the token to login to the edge device.

24. The system of claim 17, wherein the mobile device is configured to, prior to provision of the API put call, to connect to the input data source interface and determine whether the input data source is in use by another device of the system.

25. The system of claim 17, wherein the mobile device is configured to provide the API application request call to request the list of available applications associated with a particular category.

26. The system of claim 25, wherein the particular category is indicative of input component, a type of data, a type of data processing or analysis, or combinations thereof.

* * * * *